US008488157B2

(12) United States Patent  
Masuda

(10) Patent No.: US 8,488,157 B2
(45) Date of Patent: Jul. 16, 2013

(54) PRINTING SYSTEM, METHOD, AND PROGRAM FOR SEARCHING, IDENTIFYING, AND DISPLAYING INFORMATION RELATED TO NON-RETRIEVED PRINT JOBS

(75) Inventor: Hiroki Masuda, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 950 days.

(21) Appl. No.: 12/577,083

(22) Filed: Oct. 9, 2009

(65) Prior Publication Data

US 2010/0097628 A1    Apr. 22, 2010

(30) Foreign Application Priority Data

Oct. 16, 2008    (JP) .................................. 2008-267253

(51) Int. Cl.
*G06F 3/12*    (2006.01)
*G06K 15/00*    (2006.01)

(52) U.S. Cl.
USPC ......................................... 358/1.15; 358/1.14

(58) Field of Classification Search
None
See application file for complete search history.

(56) References Cited

U.S. PATENT DOCUMENTS

| 2006/0170953 | A1* | 8/2006 | Okamoto et al. ............ 358/1.15 |
| 2008/0115207 | A1  | 5/2008 | Go |
| 2008/0159769 | A1  | 7/2008 | Sato et al. |
| 2008/0259386 | A1  | 10/2008 | Fujino |

FOREIGN PATENT DOCUMENTS

| JP | 2004-362255 | 12/2004 |
| JP | 2007-019722 | 1/2007 |
| JP | 2007-087320 | 4/2007 |
| JP | 2008-100370 A | 5/2008 |
| JP | 2008-123179 | 5/2008 |
| JP | 2008165570 A | 7/2008 |
| JP | 2008-243106 | 9/2008 |

OTHER PUBLICATIONS

Japanese Office Action dated Jan. 24, 2012 issued during prosecution of related Japanese application No. 2010-272931, which is a divisional of Japanese application 2008-267253 (corresponding to the present U.S. application).

* cited by examiner

*Primary Examiner* — Fan Zhang
(74) *Attorney, Agent, or Firm* — Fitzpatrick, Cella, Harper & Scinto

(57) ABSTRACT

A printing system that enables to recover documents of a recovery target print job easily without forcing a user to do complicated operations. An information processing apparatus transmits a print job. An image forming apparatus prints out the received print job. A management information storage unit stores management information of a print job to be recovered. A management information transmission unit transmits the management information corresponding to user information. An identifying information input unit receives an input of identifying information for identifying a user. A user information transmission unit transmits the user information determined by authenticating the identifying information. A management information receiving unit receives the management information corresponding to the transmitted user information. A display control unit controls a display unit so as to display a no-outputted print job when an output operation is received, and display a no-recovered print job when a recovery operation is received.

16 Claims, 19 Drawing Sheets

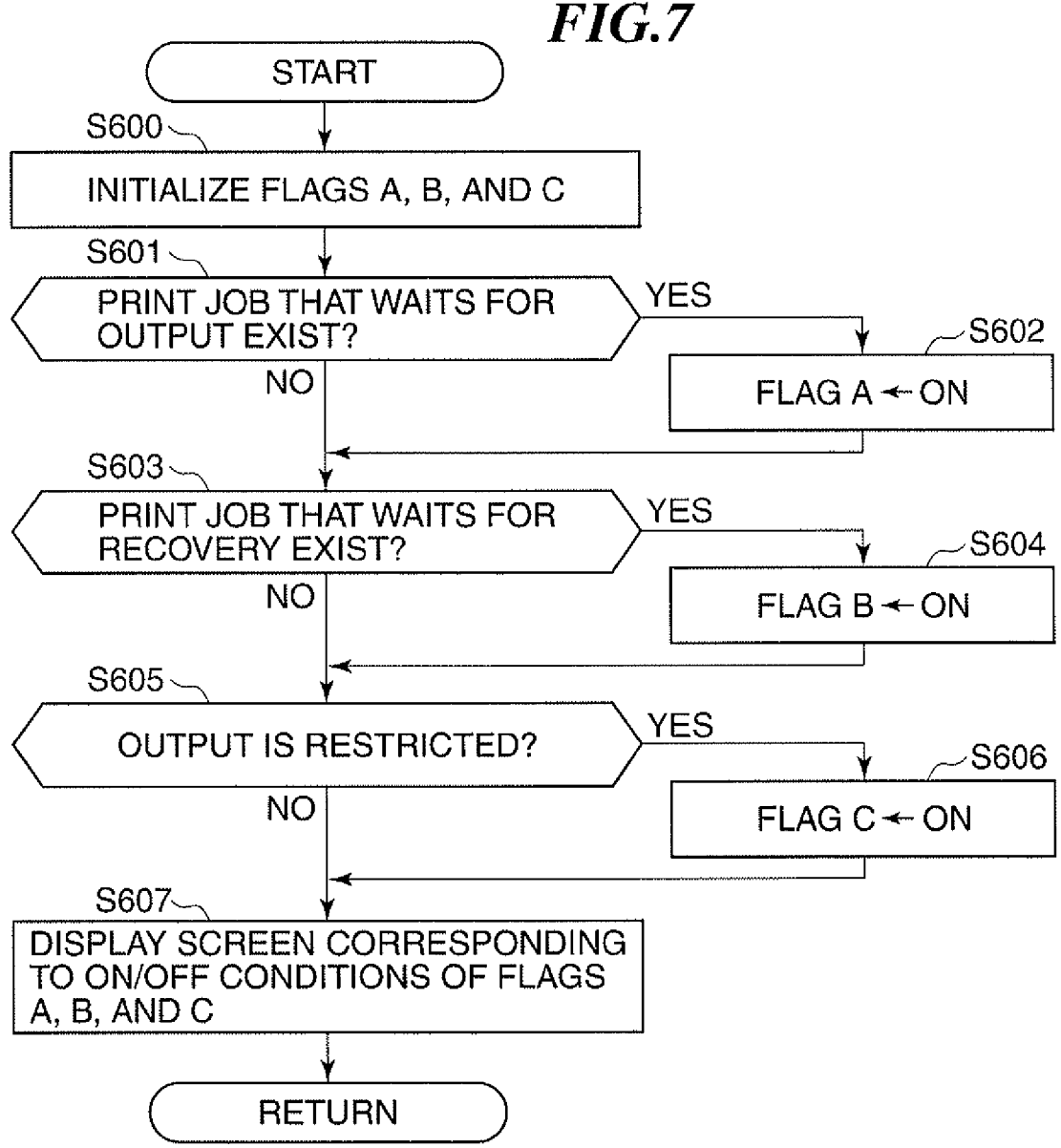

FIG.17A

USER INFORMATION ~1601

| USER ID | OUTPUT DOCUMENT ID | OUTPUT RESTRICTION FLAG | NUMBER OF OUTPUT DOCUMENT | USER NAME |
|---------|---------------------|--------------------------|----------------------------|-----------|
|         |                     |                          |                            |           |
|         |                     |                          |                            |           |
| ....    | ....                | ....                     | ....                       | ....      |

FIG.17B

DOCUMENT INFORMATION ~1602

| OUTPUT DOCUMENT ID | FILE PATH OF OUTPUT DOCUMENT | OUTPUT DATE AND TIME | OUTPUT FLAG | CONFIDEN-TIALITY LEVEL | NOTIFICA-TION FREQUENCY | RECOVERY FLAG | RECOVERY DATE AND TIME | FILE NAME |
|---------------------|-------------------------------|----------------------|-------------|-------------------------|--------------------------|----------------|-------------------------|-----------|
|                     |                               |                      |             |                         |                          |                |                         |           |
|                     |                               |                      |             |                         |                          |                |                         |           |
| ....                | ....                          | ....                 | ....        | ....                    | ....                     | ....           | ....                    | ....      |

FIG.17C

SETTING INFORMATION ~1603

| SETTING TIME | SETTING FREQUENCY | NUMBER OF SETTING DOCUMENT |
|--------------|-------------------|----------------------------|
|              |                   |                            |
|              |                   |                            |
| ....         | ....              | ....                       |

FIG.18

PRINT JOB INFORMATION 1701

| OUTPUT DOCUMENT ID | FILE PATH OF OUTPUT DOCUMENT | FILE NAME | USER ID |
|---|---|---|---|
|  |  |  |  |
|  |  |  |  |
| ⋮ | ⋮ | ⋮ | ⋮ |

FIG.19

AUTHENTICATION INFORMATION 1801

| USER ID | CARD ID |
|---|---|
|  |  |
|  |  |
| ⋮ | ⋮ |

FIRST SCREEN

SECOND SCREEN

THIRD SCREEN

FOURTH SCREEN

FIFTH SCREEN

SIXTH SCREEN

PRINTING SYSTEM, METHOD, AND PROGRAM FOR SEARCHING, IDENTIFYING, AND DISPLAYING INFORMATION RELATED TO NON-RETRIEVED PRINT JOBS

BACKGROUND OF THE INVENTION

1. Field of the Invention

The present invention relates to a printing system, a control method therefor, a storage medium storing a control program therefor, and an image forming apparatus, and particularly relates to the printing system for printing a document via a network, the control method therefor, the storage medium storing the control program, and the image forming apparatus.

2. Description of the Related Art

In recent years, information leakage matters where information that should be managed by companies as secrecy leaks outside, such as leakage of personal information, have occurred frequently. Therefore, a security system for preventing or inhibiting leakage of confidential information is required.

Although an improvement of a security technique prevents leakage of electronic information managed by a computer, a paper document (a printed matter) obtained by printing the electronic information may still leak outside. As a method of inhibiting leakage of confidential documents by managing recovery conditions of the outputted confidential documents, Japanese laid-open patent publication (Kokai) No. 2008-123179 (JP2008-123179A) discloses an authentication printing system, for example. The authentication printing system operates so as not to allow a departure of a user who outputted the documents when the confidential documents are not recovered.

However, since the system of the above mentioned prior art determines that the confidential documents have been recovered when the user re-authenticates, the re-authenticated documents are determined to be recovered even if the documents are not recovered in fact, which gives difficulty of recovering the confidential documents appropriately.

Further, since the system of the above mentioned prior art determines that the confidential documents have been recovered when a recovery confirmation code that has been inputted at the time of departure is correct, the confidential documents that are not recovered in fact are determined to be recovered, which gives difficulty of preventing a recovery failure of the confidential documents.

Still further, since the system of the above mentioned prior art requires recovery checks for general documents that are not necessary to be treated as the confidential documents, the user is forced to do complicated operations. Further, in a company where many documents are printed, there is a problem that the printing operation delays owing to the recovery check operation.

SUMMARY OF THE INVENTION

The present invention provides a printing system, a control method therefor, a storage medium storing a control program therefor, and an image forming apparatus that are capable of recovering documents of a recovery target print job (for example, confidential documents) easily without forcing a user to do complicated operations.

Accordingly, a first aspect of the present invention provides a printing system comprising an information processing apparatus adapted to transmit a print job, comprising a management information storage unit that stores management information including no-output information and recovery information of a print job that becomes a target to be recovered and a management information transmission unit that transmits the management information including the no-output information and the recovery information of the print job corresponding to user information, an image forming apparatus adapted to print out the print job received from the information processing apparatus, comprising an identifying information input unit that receives an input of identifying information for identifying a user, and a user information transmission unit that transmits the user information determined by authenticating the received identifying information to the information processing apparatus a management information receiving unit that receives the management information of the print job corresponding to the transmitted user information from the information processing apparatus, a display unit that displays a screen corresponding to the management information, and a display control unit that controls the display unit so as to display a no-outputted print job according to the no-output information included in the management information when an output operation for the print job is received on the displayed screen, and to display a no-recovered print job according to the recovery information included in the management information when a recovery operation for the print job is received.

Accordingly, a second aspect of the present invention provides a control method for a printing system that is provided with an information processing apparatus for transmitting a print job and an image forming apparatus for printing out the print job received from the information processing apparatus, the method comprising a management information storage step of storing management information including no-output information and recovery information of a print job that becomes a target to be recovered, a management information transmission step of transmitting the management information including the no-output information and the recovery information of the print job corresponding to user information, a management information replying step of sending the management information, which includes the no-output information and the recovery information of the print job corresponding to the user information received from the image forming apparatus, to the image forming apparatus concerned, a display step of displaying a screen corresponding to the management information received by the image forming device, wherein a no-outputted print job is displayed according to the no-output information included in the management information when an output operation for the print job is received on the displayed screen, and a no-recovered print job is displayed according to the recovery information included in the management information when a recovery operation for the print job is received, in the display step.

Accordingly, a third aspect of the present invention provides a computer-readable storage medium storing a control program causing a computer to execute the control method.

Accordingly, a fourth aspect of the present invention provides an image forming apparatus that prints out a print job received from an information processing apparatus, comprising a management information storage unit adapted to store management information including no-output information and recovery information of a print job that becomes a target to be recovered, an identifying information input unit adapted to receive an input of identifying information for identifying a user, a management information acquisition unit adapted to acquire the management information of the print job corresponding to the user information determined by authenticating the input identifying information, a display unit adapted to display a screen corresponding to the acquired management information, and a display control unit adapted to control the display unit so as to display a no-outputted print job according to the no-output information included in the management information when an output operation for the print job is received on the displayed screen, and to display a no-recovered print job according to the recovery information included in the management information when a recovery operation for the print job is received.

According to the present invention, documents of the recovery target print job (for example, confidential documents) can be easily recovered without forcing the user to do complicated operations.

Further features of the present invention will become apparent from the following description of exemplary embodiments with reference to the attached drawings.

BRIEF DESCRIPTION OF THE DRAWINGS

FIG. 7 is a flowchart showing a flag setting process of the document output device when displaying a screen according to document management information.

FIG. 8 is a view showing kinds of screens displayed by the document output device corresponding to ON/OFF conditions of flags A to C set up by the flag setting process.

FIG. 17A is a view showing user information as an example of the document management information (print job management information) saved and managed by the document management server.

FIG. 17B is a view showing document information as an example of the document management information (print job management information) saved and managed by the document management server.

FIG. 17C is a view showing setting information as an example of the document management information (print job management information) saved and managed by the document management server.

FIG. 18 is a view showing an example of print job information saved and managed by the document output device.

FIG. 19 is a view showing an example of authentication information saved and managed by the document management server.

DESCRIPTION OF THE EMBODIMENTS

Hereafter, an embodiment according to the present invention will be described in detail with reference to the drawings.

Figure 1:
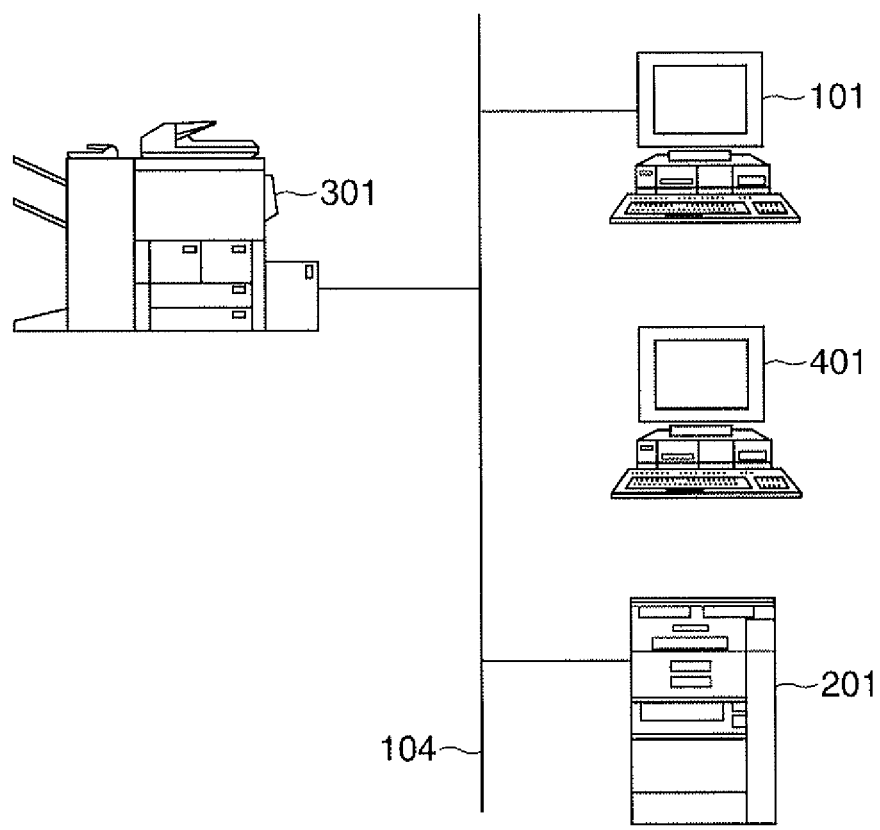
FIG. 1 is a view schematically showing a configuration example of a printing system according to an embodiment of the present invention.

FIG. 1 is a view schematically showing a configuration example of a printing system according to an embodiment of the present invention.

In FIG. 1, the printing system according to the embodiment of the present invention is provided with a user-oriented PC (Personal Computer) 101 (an information processing apparatus) that is used by a user, a document management server 201 (the information processing apparatus), a document output device 301 (an image forming apparatus) that has an image forming function such as a printer and a multifunctional peripheral device, and an administrator-oriented PC 401 (the information processing apparatus), which are mutually connected via a network 104 such as a LAN (Local Area Network).

The various devices that constitute the printing system are not limited to the example shown in the figure, and there are various configuration examples according to applications and purposes. For example, if the user-oriented PC 101 or the document output device 301 has the functions (accumulation and management of print jobs) of the document management server 201, the system can omit the document management server 201.

Figure 2:
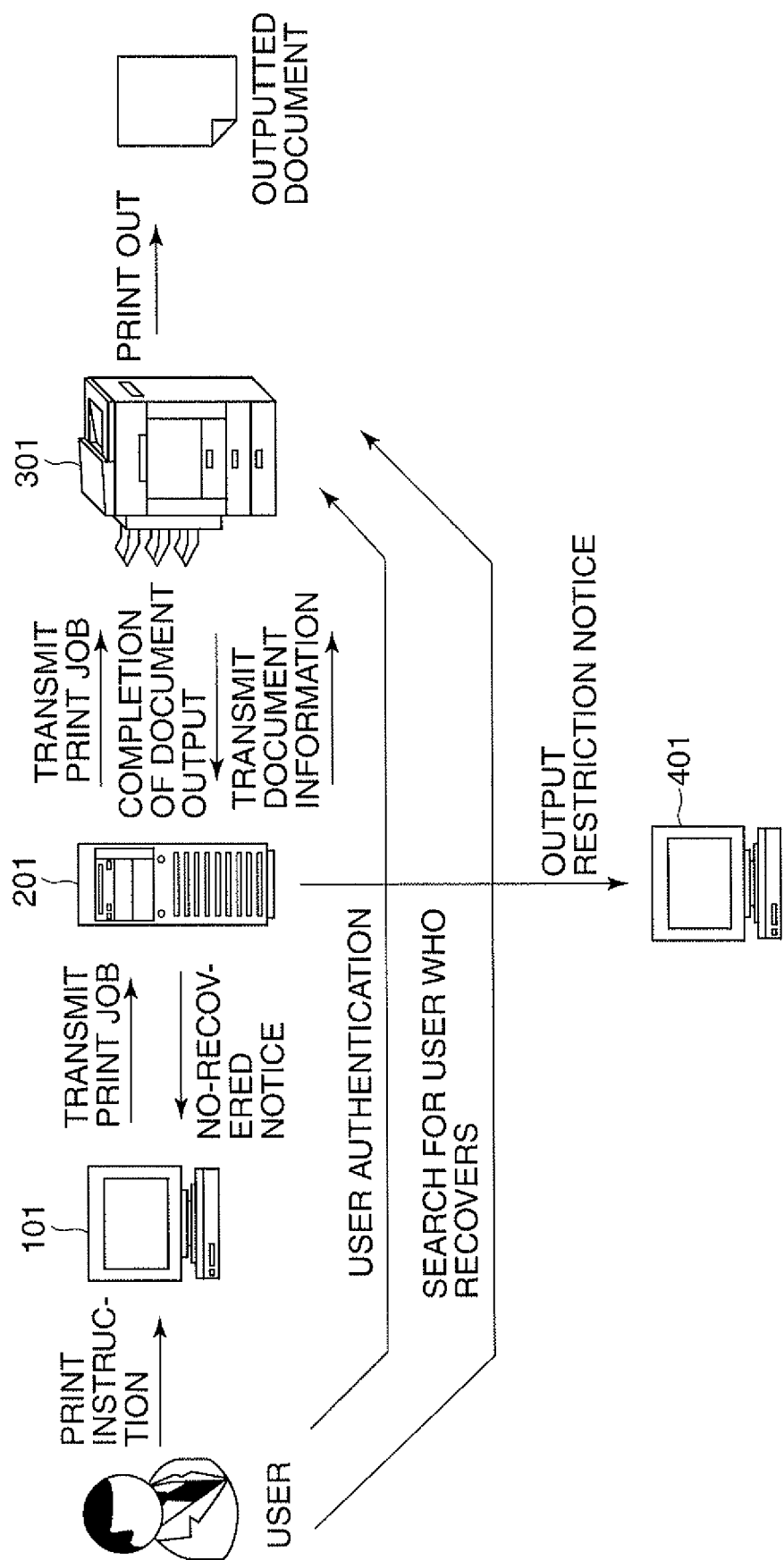
FIG. 2 is a view showing a flow of outputting a document in the printing system of FIG. 1.

FIG. 2 is a view showing a flow of outputting a document (printing a document file) in the printing system of FIG. 1.

First, a user operates the user-oriented PC 101 so as to give an instruction for printing a document file. The user-oriented PC 101 is provided with a printer driver, and transmits a print job to the document management server 201 when receiving a print setting from the user on a UI (User Interface) provided by the printer driver concerned.

The printer driver allows to set a condition to the print job via the UI thereof. The condition defines whether the document (printed matter) outputted by the transmitting print job should be recovered by the user, that is, whether the outputted document is confidential. A document recovery process mentioned later is performed about the print job that is set so that it is necessary to recover (it is confidential). As for the print job that is set so that it is necessary to recover, a character string "_x_" (x: a natural number) is given to a head of a file name by the printer driver.

It should be noted that although the embodiment is constituted so that the printer driver gives the predetermined character string to the file name of the print job that is set so that it is necessary to recover according to the print setting from the user, the user itself may give it. Further, although the embodiment is constituted to determine whether the print job is necessary to recover according to the character string given to the file name, the printer driver may store setting information that defines whether the print job is necessary to be recovered or not into header information of the print job. In this case, when there is the information showing that the print job is necessary to be recovered, the document recovery process mentioned later is performed.

Receiving a print job, the document management server 201 transmits (transfers) the print job to a predetermined printer (the document output device 301, here). The document management server 201 sends a notice that urges to recover (a no-recovered notice) to the user-oriented PC 101, when the document outputted from the document output device 301 is not recovered promptly. The notice that urges to recover (the no-recovered notice) may be sent by any methods, for example, it may be sent as an e-mail, or it may be displayed by a message box on a screen. If the outputted document has not been recovered in a long term or a large amount of the outputted documents are not recovered, the document management server 201 sends an output restriction notice to the administrator-oriented PC 401, and performs an output restriction on the confidential document.

After receiving the print job from the document management server 201 and performing user authentication if needed, the document output device 301 prints out a document. Since the document output device 301 can search for a user who may recover an outputted document improperly and can notify existence of a document outputted by another user at the time of recovering the outputted document, it can prevent the improper recovery of the outputted document.

The document output device 301 notifies completion of outputting the document to the document management server 201, acquires document management information (an output restriction flag of user information 1601 in FIG. 17A, an output flag and a recovery flag of document information 1602 in FIG. 17B), and then displays a predetermined screen.

Figure 3:
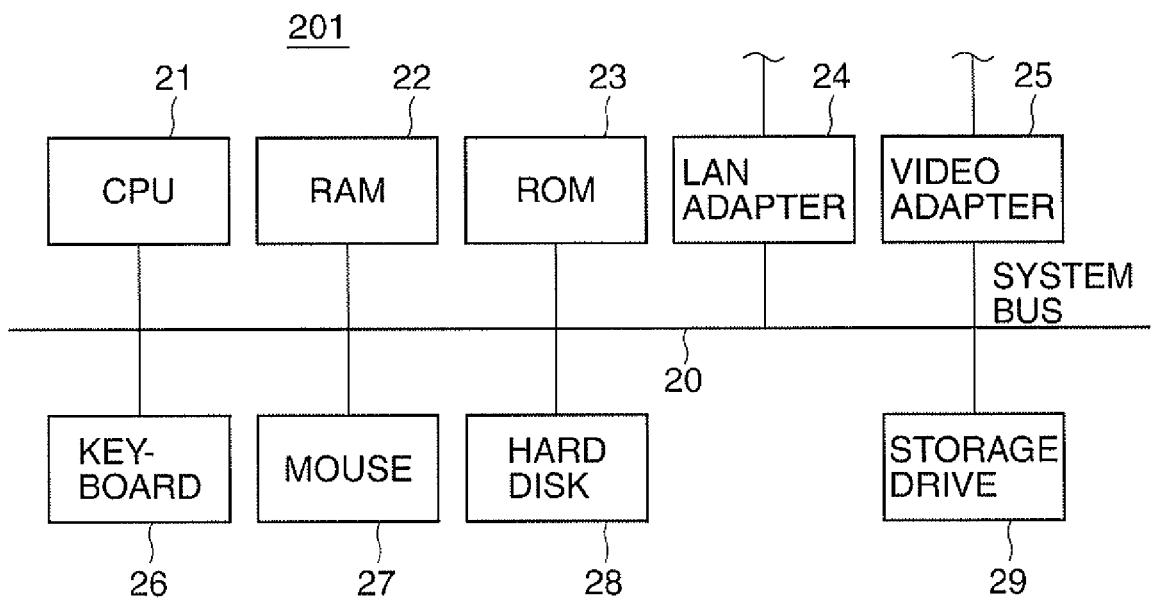
FIG. 3 is a block diagram showing an outline of a hardware configuration of a document management server in the printing system.

FIG. 3 is a block diagram showing an outline of a hardware configuration of the document management server 201 in the printing system of FIG. 1. It should be noted that since the document management server 201, the user-oriented PC 101, and the administrator-oriented PC 401 have almost the same configuration, only the document management server 201 will be described.

In FIG. 3, the document management server 201 is provided with a CPU 21, a RAM 22, a ROM 23, a LAN adapter 24, a video adapter 25, a keyboard 26, a pointing device such as a mouse 27, a hard disk 28, and a storage drive 29, which are mutually connected via a system bus 20. The system bus 20 is constituted by a PCI bus, an AGP bus, a memory bus, etc., for example. It should be noted that a chip for connecting the respective buses, a keyboard interface, and an I/O interface such as so-called SCSI and ATAPI are omitted in the example shown in the figure.

The CPU 21 executes various kinds of computations such as four fundamental operations and comparison operations based on a program of an operation system and various application programs, and controls hardware. The RAM 22 stores the program of the operation system and the application programs read from the hard disk 28 and a storage medium such as a CD-ROM or a CD-R that is equipped to the storage drive 29. These programs are executed under the control of the CPU 21.

The ROM 23 stores a so-called BIOS that controls input/output to the hard disk etc. in cooperation with the operation system. The LAN adapter 24 communicates with an exterior via the network in cooperation with a communications program of the operation system controlled by the CPU 21. The video adapter 25 generates an image signal outputted to a display unit (not shown in the figure). The keyboard 26 and the mouse 27 are used in order to input instructions to the document management server 201.

The hard disk 28 stores information needed to the printing system such as the user information, the document information, setting information, and the authentication information in addition to saving the operation system and the various applications. The storage drive 29 equips with a storage medium, such as a CD-ROM, a CD-R, a CD-R/W, a DVD, etc. and is used for installing an application program into the hard disk 28. It should be noted that the storage drive 29 is not only a drive for a CD-ROM but may be also drives for a CD-R, a CD-R/W, an MO, a DVD+-R, a DVD-RAM, etc.

Figure 4:
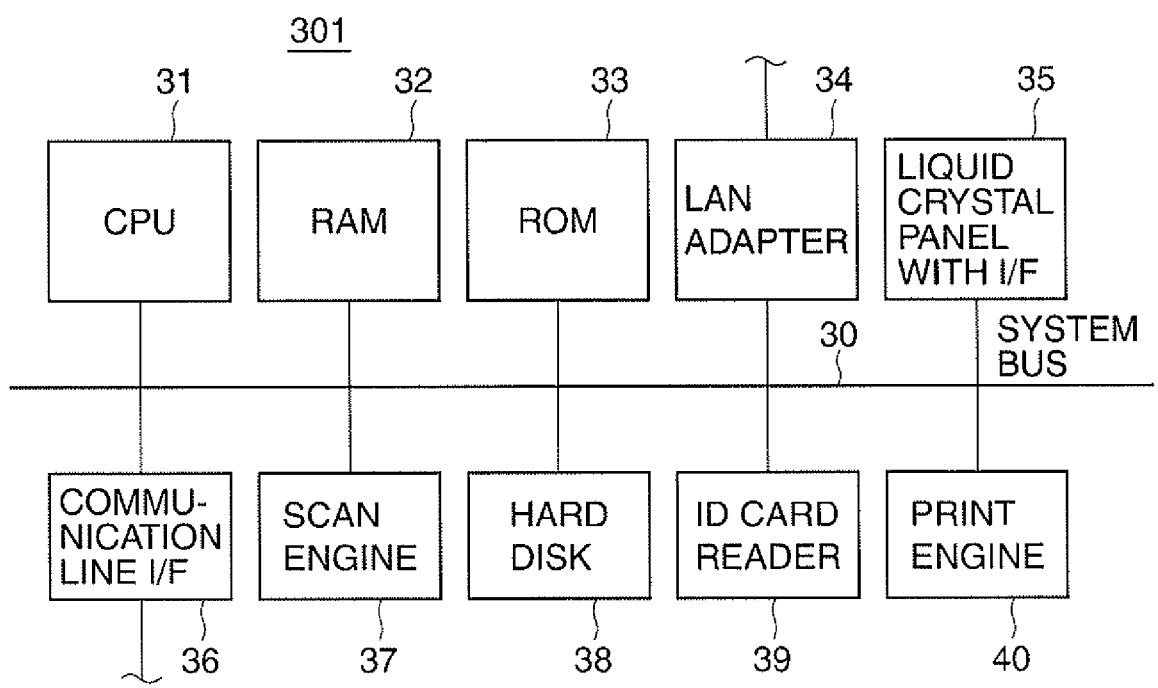
FIG. 4 is a block diagram showing an outline of a hardware configuration of a document output device in the printing system.

FIG. 4 is a block diagram showing an outline of a hardware configuration of the document output device 301 in the printing system.

In FIG. 4, the document output device 301 is provided with a CPU 31, a RAM 32, a ROM 33, a LAN adapter 34, a liquid crystal panel with I/F 35, a communication line I/F 36, a scan engine 37, a hard disk 38, an ID card reader 39, and a print engine 40, which are mutually connected via a system bus 30.

The liquid crystal panel with I/F 35 comprises a touch panel that has a display function and a data input function. The communication line I/F 36 controls an interface with a telephone line. The scan engine 37 reads an original optically, converts it into digital image data, and inputs. The ID card reader 39 is a reader for reading memory contents of an ID card that each user has individually, and is a contact type reader that reads ID information from the ID card inserted therein, for example. The print engine 40 outputs the digital image data inputted from the scan engine 37 and the print job received from the document management server 201 as a print document (printed matter). The hard disk 38 stores a transport program for transmitting the document information to the document management server 201 in addition to the system program etc.

Next, a confidentiality determination process for a print job executed by the document management server 201 will be described. According to the embodiment, after the document management server 201 determines the confidentiality of the print job received from the user-oriented PC 101 via the network 104, this print job is transmitted to the document output device 301. It should be noted that the process described below is executed in fact when the CPU 21 in the document management server 201 or the CPU 31 in the document output device 301 executes the control program read from the ROM 23 or 33 or the hard disk 28 or 38.

Figure 5:
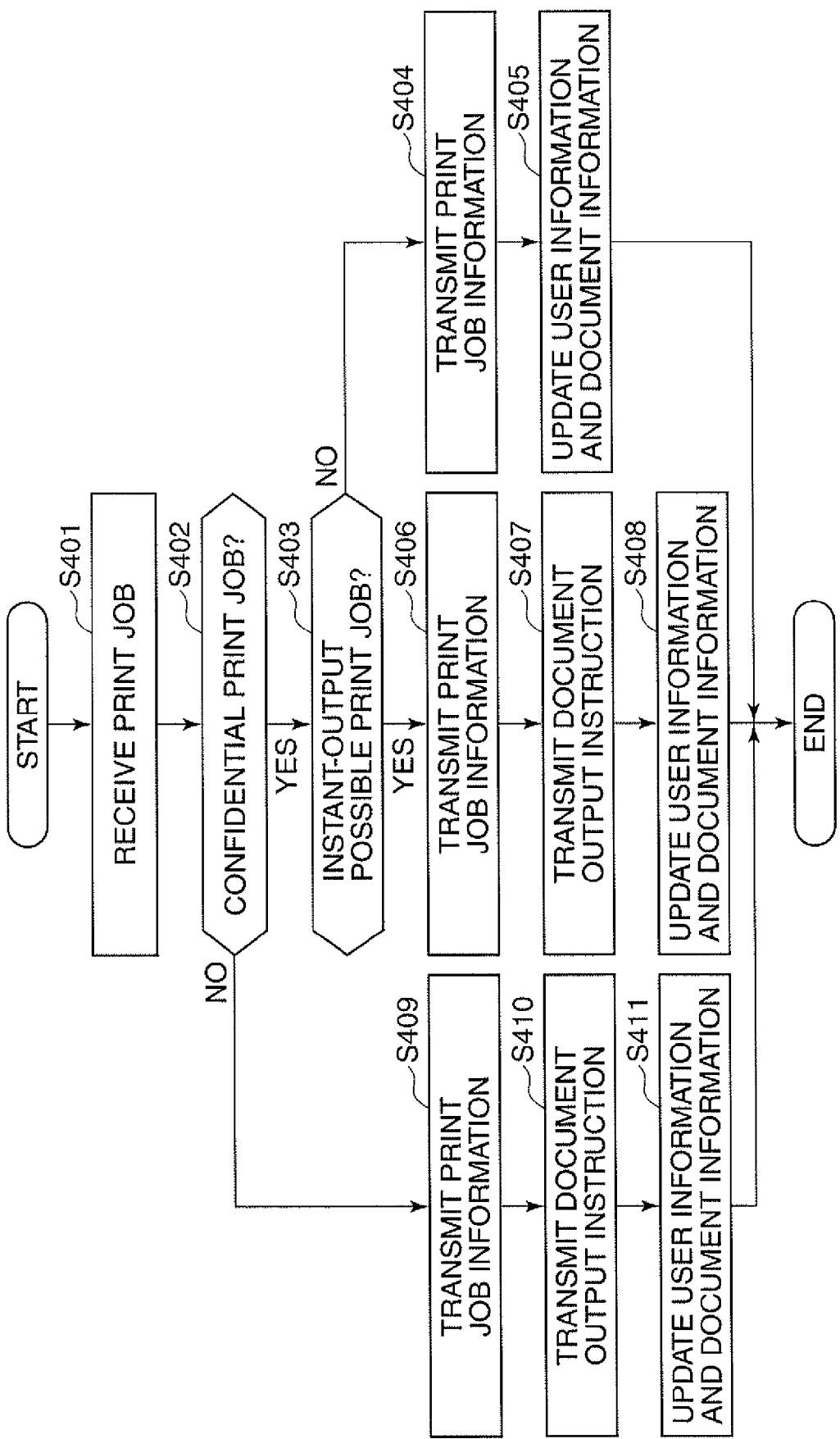
FIG. 5 is a flowchart showing a confidentiality determination process for a print job executed by the document management server.

FIG. 5 is a flowchart showing the confidentiality determination process for the print job executed by the document management server 201.

In FIG. 5, receiving the print job from the user-oriented PC 101 (step S401), the document management server 201 determines whether the print job has confidentiality based on a file name of the print job concerned (step S402). Here, it is determined whether the print job has confidentiality (a first recovery job determination) according to the determination of whether the leading character string of the file name of the print job has "_x_" (x: a natural number). When the leading character string of the file name has "_x_" (x: a natural number), it is determined that the print job has confidentiality (it is called "a confidential print job" hereinafter) (a determination of a confidentiality level). It should be noted that the confidentiality level is determined by the value of "x" (a determination method of the confidentiality level is mentioned later). On the other hand, when the leading character string of the file name does not have "_x_", it is determined that the print job does not have confidentiality (it is called "a normal print job" hereinafter).

When the print job is determined as the normal print job (NO in step S402), the document management server 201 transmits print job information to the document output device 301 (step S409). The print job information includes an output document ID (a print job ID), a file name, a file storage destination path (an output document file path), and a user ID of the user who instructed to print, etc. The output document ID is identification information for identifying the output document (the print job) uniquely. Receiving the print job, the document management server 201 generates the output document ID corresponding to the print job concerned. The file name is a file name of the print job. The file storage destination path (the output document file path) is a path that shows the storage destination of the print job file. The user ID is an ID of the user who transmits the print job, and is recorded in the management information in the print job.

Although the document output device 301 as a single device is connected to the document management server 201 in the embodiment, a plurality of document output devices may be connected. In this case, the print job information is transmitted to each of the document output devices.

Next, the document management server 201 transmits an output instruction of a document (a print job) to the document output device 301 (step S410). The transmission of the output instruction means transmitting a print job, and the print job that is received in step S401 is transmitted to the document output device 301 that is specified by the printer driver of the user-oriented PC 101. The document management server 201 subsequently executes an update process for the user information and the document information that are saved and managed by the server 201 concerned (step S411). The outline configuration of the user information is shown in FIG. 17A, the outline configuration of the document information is shown in FIG. 17B, and the outline configuration of the setting information is shown in FIG. 17C. The various kinds of information shown in FIGS. 17A through 17C are saved and managed in the document management server 201.

In FIG. 17A, the user information 1601 comprises the user ID for identifying a user, the output document ID, the output restriction flag that is set by the administrator, the number of the output documents that is calculated by subtracting the number of the recovered document from the number of the confidential documents outputted by the document output device, and the user name.

In FIG. 17B, the document information 1602 comprises the output document ID, the output document file path (the file storage destination path), date and time of output, the output flag, the confidentiality level, a notification frequency, a recovery flag, date and time of recovery, and the file name. The date and time of output is the date and time when the document output device printed out the document. The output flag is a flag that shows whether the document output device printed out the document or not. The confidentiality level is a flag that shows the level of confidentiality of the document (the print job), and one of the values "0", "1", and "2" is registered. The meaning of each value is as follows: 0: a general document (a normal print job), 1: a confidential document that does not require authentication at the time of output (an instant-output possible print job), and 2: a confidential document that requires authentication at the time of output (an authenticated output print job). The instant-output possible print job has the confidentiality level higher than that of the normal print job, and means the print job that can be printed instantly. The authenticated output print job has the confidentiality level still higher than that of the instant-output possible print job, and means the print job that cannot be printed instantly. The notification frequency is a frequency of notices that are sent to the user every time when a setup time had elapsed after the document has been outputted. The recovery flag is a flag that shows whether the document is needed to be recovered (a flag for determining a recovery job), and one of the values "ON" and "OFF" is registered. The meaning of each value is as follows: ON: recovered (unnecessary to recover), and OFF: no-recovered (necessary to recover). The date and time of recovery is a date and time when the document has been recovered. The file name is a file name of the print job as mentioned above.

The setup information 1603 shown in FIG. 17C comprises the setup time to which a notification interval for sending the notice to urge the document recovery to the user is registered, a setting frequency to which the limit frequency of the notice to the user until the output restriction is executed is registered, and a number of setting document to which the limit number of the documents outputted by the user until the output restriction is executed is registered. The user information shown in FIG. 17A, the document information shown in FIG. 17B, and the setup information shown in FIG. 17C are collectively called the document management information (the print job management information).

Returning to FIG. 5, in the update process for the document information in step S411, the output document ID (the print job ID) is registered in the output document ID of the user information 1601, and the number of the output documents is increased. The print job ID is registered into the output document ID of the document information 1602, and the date and time when the document has been outputted is registered into the date and time of output. The value "outputted" is registered into the output flag, and the value "0" is registered into the confidentiality level. Further, the value "recovered" is registered into the recovery flag. It should be noted that the value "recovered" is information showing that the document is a general document that is unnecessary to be recovered. The document is processed as recovered at this timing.

In step S402, when determined as the confidential print job (YES in step S402), the document management server 201 determines whether the confidential print job is the instant-output possible print job (the print job with low confidentiality level) (step S403). That is, in step S403, an authentication printing determination that determines whether the print job can be printed according to the authentication is performed. If all the outputted documents are the targets of recovery, the load of the user increases. Therefore, it is determined whether the print job is the instant-output possible print job in order to reduce the user's load. The "x" section in the leading character string "_x_" of the file name of the print job is used to determine whether the print job is an instant-output possible print job. For example, when "x" is "2" (the leading character string of the file name is "_2_"), it is determined that the print job is the authenticated output print job. On the other hand, when "x" is "1", it is determined that the print job is the instant-output possible print job.

In step S403, when the print job is determined as the instant-output possible print job (YES in step S403), the document management server 201 transmits the print job information to the document output device 301 (step S406) and transmits the output instruction of the document (step S407). The print job information includes the output document ID, the file name, the file storage destination path, and the user ID, as in the case of step S409. The transmission of the output instruction means transmitting a print job, and the print job that is received in step S401 is transmitted to the document output device 301 that is specified by the printer driver of the user-oriented PC 101.

Next, the document management server 201 executes the update process for the user information and the document information (step S408). In the update process of the document information in step S408, the ID of the outputted document (the print job ID) is registered into the output document ID of the user information 1601, and the number of the output documents is increased. The print job ID is registered into the output document ID of the document information 1602, and the date and time when the document has been outputted is registered into the date and time of output. The value "outputted" is registered into the output flag, and the value "1" is registered into the confidentiality level. Further, the value "no-recovered" is registered into the recovery flag.

On the other hand, in step S403, when the print job is determined as the authenticated output print job (NO in step S403), the document management server 201 transmits the print job information to the document output device 301 (step S404) and executes the update process for the user information and the document information (step S405). In the update process for the document information in step S405, the ID of the outputted document (the print job ID) is registered into the output document ID of the user information 1601, and the number of the output documents is increased. The print job ID is registered into the output document ID of the document information 1602, and the file name is registered. The value "no-outputted" is registered into the output flag, and the value "2" is registered into the confidentiality level. The recovery flag is kept as empty (NULL).

It should be noted that although the confidentiality is determined with reference to the file name in the above-mentioned process, various criteria may be used according to an application or an object.

Next, an output process of the print job in the document output device 301 will be described.

Figure 6:
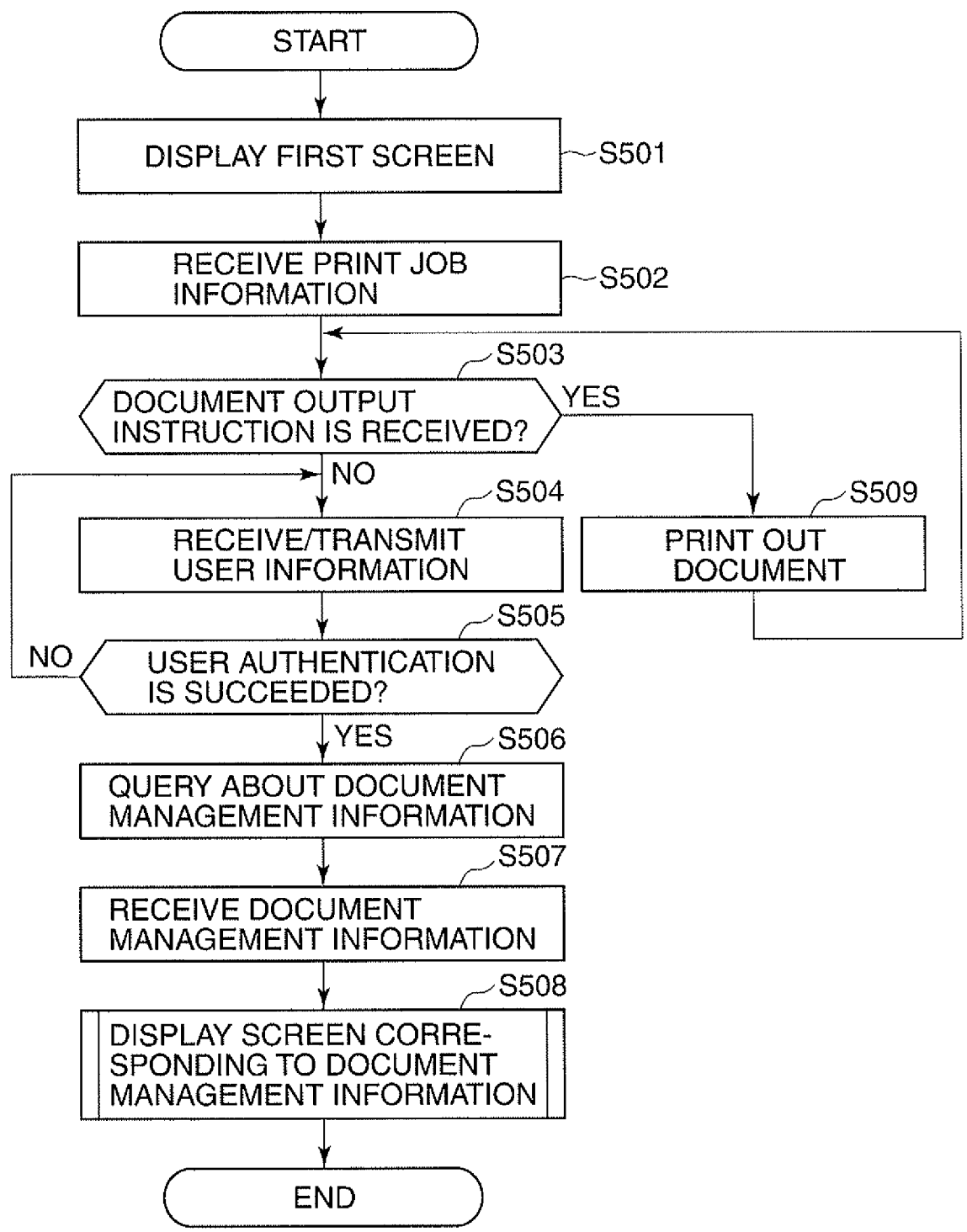
FIG. 6 is a flowchart showing an output process for the print job executed by the document output device.

FIG. 6 is a flowchart showing the output process for the print job executed by the document output device 301.

Figure 20A:
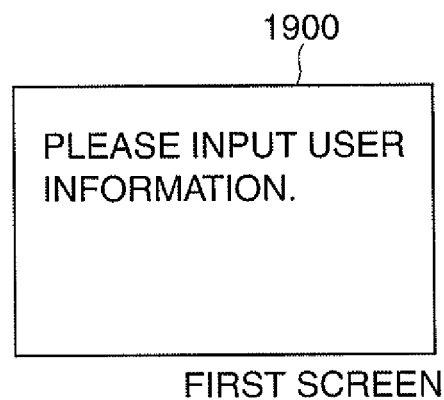
FIG. 20A is a view showing an initial screen as an example of a screen displayed by the document output device.

In FIG. 6, the document output device 301 displays a first screen 1900 shown in FIG. 20A as an initial screen on the liquid crystal panel with I/F 35 at the time of starting (step S501). Next, the document output device 301 receives the print job information from the document management server 201 (step S502), and stores the print job information concerned into the RAM 32 or the hard disk 38. As shown in FIG. 18, the print job information stored includes the output document ID, the file storage destination path, the file name, and the user ID.

Next, the document output device 301 determines whether the document output instruction has been received from the document management server 201 (step S503), and outputs the print job (the document output) (step S509) when the document output instruction has been received (YES in step S503).

On the other hand, when the document output instruction has not been received (NO in step S503), the document output device 301 receives the input of the user information from the user (step S504). Specifically, when the user holds the ID card to the ID card reader 39, the document output device 301 acquires a card ID (identifying information for identifying a user) memorized in the ID card via the ID card reader 39 (identifying information input). Then, the document output device 301 transmits the received identifying information to the document management server 201 in order to perform a user authentication, and determines whether the user authentication has been succeeded (step S505). It should be noted that biological information (for example, a fingerprint, palm geometry, a retina, etc.) can be used as the identifying information in place of the card ID. In such a case, the ID card reader 39 is replaced with a biological information reader that reads biological information.

The document management server 201 refers to the authentication information 1801 (see FIG. 19) that is saved and managed in the hard disk 28 etc. to find the user ID (the user information) corresponding to the card ID (the identifying information) of the user information received from the document output device 301. If the corresponding user ID is found, the document management server 201 determines that the user authentication is completed, and transmits the notice showing the success of the user authentication to the document output device 301. On the other hand, when there is no user ID corresponding to the card ID, a notice showing a failure of the user authentication is transmitted to the document output device 301.

In step S505, when it is determined that the user authentication has been succeeded (YES in step S505), the document output device 301 acquires the print job information stored in the document output device 301 based on the authenticated user ID, and queries about a document condition to the document management server 201 based on the output document ID of the print job information (step S506). Specifically, the document output device 301 transmits the output document ID to the document management server 201.

The document management server 201 acquires the document management information (the output restriction flag in the user information 1601 of FIG. 17A, and the output flag and the recovery flag in the document information 1602 of FIG. 17B) based on the output document ID received from the document output device 301, and transmits the recovery condition (the recovery information about whether the recovery flag represents "recovered" or "no-recovered"), an output condition (a no-outputted information about whether the output flag represents "outputted" or "no-outputted"), and the output restriction condition (the information about whether the output restriction flag represents "under the output restriction" or "not under the output restriction") to the document output device 301. It should be noted that all the output document IDs corresponding to the authenticated user ID become targets of the query.

The document output device 301 receives the document management information (the output restriction flag in the user information 1601 of FIG. 17A, and the output flag and the recovery flag in the document information 1602 of FIG. 17B) from the document management server 201 (step S507), and displays one of various screens as shown in FIGS. 21A through 21D corresponding to the document management information concerned (step S508). The details of step S508 will be described later.

Although an ID card authentication is assumed as the user authentication method in the above-mentioned process, various methods may be used according to an application or an object.

Next, a flag setting process that is executed by the document output device 301 when one of the various screens is displayed corresponding to the document management information (the output restriction flag in the user information 1601 of FIG. 17A, and the output flag and the recovery flag in the document information 1602 of FIG. 17B) in step S508 of FIG. 6 will be described with reference to FIG. 7.

FIG. 7 is a flowchart showing the flag setting process that is executed by the document output device 301 when one of the various screens is displayed corresponding to the document management information (the output restriction flag in the user information 1601 of FIG. 17A, and the output flag and the recovery flag in the document information 1602 of FIG. 17B).

In FIG. 7, the document output device 301 initializes flags A, B, and C (turns OFF all the flags) in the first place (step S600). The flag A is a no-outputted document existence flag that shows whether the print job that waits for output exists. The flag B is a no-recovered document existence flag that shows whether the print job that waits for recovery exists. The flag C is an output restriction flag that shows whether the user is restricted to output. It should be noted that the flag C is stored into the document output device 301 according to the output restriction flag in the user information shown in FIG. 17A.

Next, the document output device 301 determines whether the print job that waits for output exists (step S601). Here, the document output device 301 determines whether the print job whose output flag of the output document ID corresponding to the authenticated user ID is "no-outputted" exists in the received document management information (the output restriction flag in the user information 1601 of FIG. 17A, and the output flag and the recovery flag in the document information 1602 of FIG. 17B). This means that there is the print job that the document output device 301 does not complete to output the document in spite of receiving the print job from the user-oriented PC 101. If the print job that waits for output exists, the flag A turns ON (step S602). Otherwise (NO in step S601), the process proceeds to step S603 as is.

In step S603, the document output device 301 determines whether the print job that waits for recovery (no-recovered document) exists. Here, the document output device 301 determines whether the print job whose recovery flag of the output document ID corresponding to the authenticated user ID is "no-recovered" exists in the received document management information (the output restriction flag in the user information 1601 of FIG. 17A, and the output flag and the recovery flag in the document information 1602 of FIG. 17B). If the print job that waits for recovery exists, the flag B turns ON (step S604). Otherwise (NO in step S603), the process proceeds to step S605 as is.

In step S605, the document output device 301 determines whether the user is restricted to output. Here, the document output device 301 determines whether the output restriction flag corresponding to the authenticated user ID is "ON (under the output restriction)" or "OFF (not under the output restriction)" in the received document management information (the output restriction flag in the user information 1601 of FIG. 17A, and the output flag and the recovery flag in the document information 1602 of FIG. 17B). If the user does not recover the documents in a long term or a large amount of the documents are not recovered, the output restriction flag is ON. If the user is restricted to output (the output restriction flag is ON), the flag C turns ON (step S606). Otherwise (NO in step S605), the process proceeds to step S607.

In step S607, the document output device 301 displays a predetermined screen corresponding to the ON/OFF conditions of the flags A through C (step S607). FIG. 8 is a view showing kinds of screens displayed by the document output device 301 corresponding to ON/OFF conditions of flags A through C set up by the above described flag setting process.

Case 1: flag A: OFF, flag B: OFF, flag C: OFF

Figure 20B:
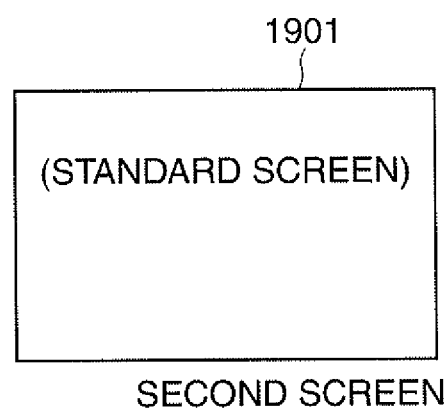
FIG. 20B is a view showing a standard screen as an example of a screen displayed by the document output device.
Figure 21A:
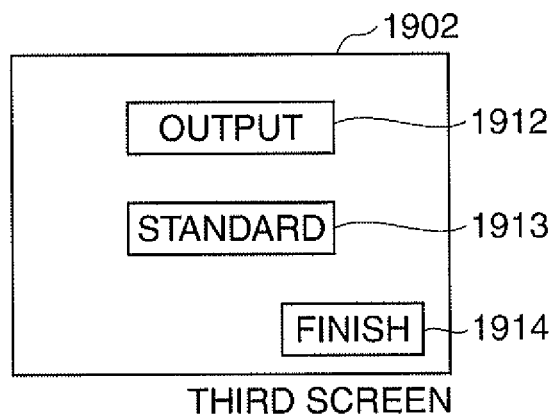
FIG. 21A is a view showing an example of a screen displayed by the document output device during the process of FIG. 9.
Figure 21B:
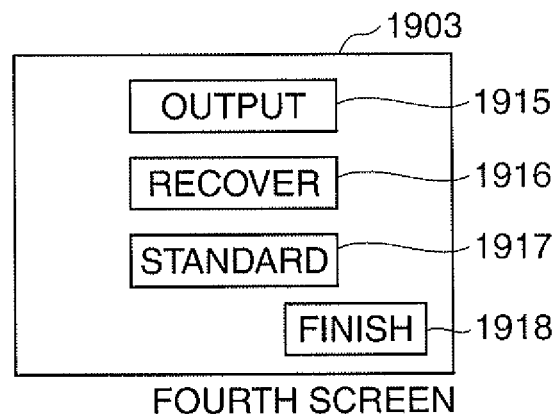
FIG. 21B is a view showing an example of a screen displayed by the document output device during the process of FIG. 10.
Figure 21C:
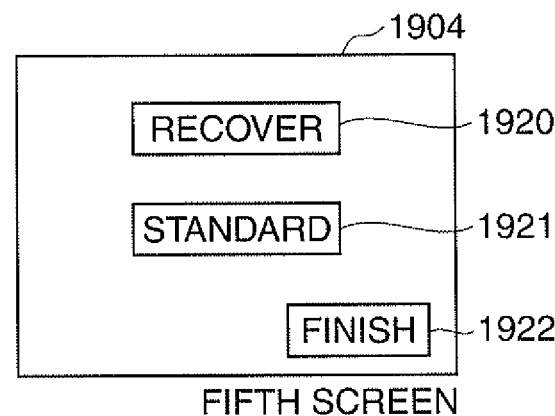
FIG. 21C is a view showing an example of a screen displayed by the document output device during the process of FIG. 11.
Figure 21D:
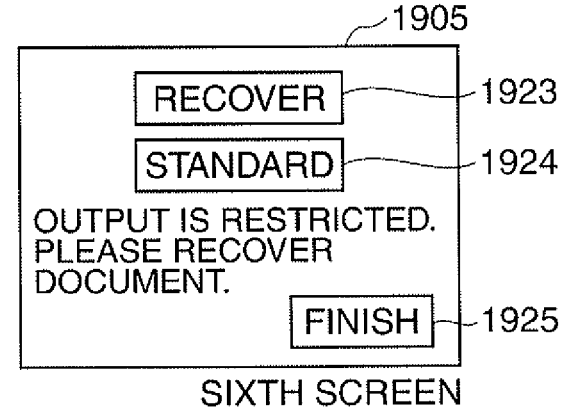
FIG. 21D is a view showing an example of a screen displayed by the document output device during the process of FIG. 11.

The fact that all the flags are OFF means that the authenticated user is not required outputting and recovering the confidential document at the present time. In this case, the document output device 301 displays a standard screen (a second screen 1901) shown in FIG. 20B, and finishes the process. The standard screen is a displaying screen with which the document output device 301 is provided as standard, and a copy function, a facsimile function, a transmitting function of a file, etc. can be operated thereon.

Case 2: flag A: ON, flag B: OFF, flag C: OFF

The fact that the flag A alone is ON means that the authenticated user has a document that waits for output but has no document that has not recovered. In this case, the document output device 301 displays a third screen 1902 shown in FIG. 21A. In the third screen 1902, an output button 1912, a standard button 1913, and a finish button 1914 are arranged.

Case 3: flag A: ON, flag B: ON, flag C: OFF

The fact that the flags A and B are ON means that the authenticated user has a document that waits for output and has a document that has not recovered. In this case, the document output device 301 displays a fourth screen 1903 shown in FIG. 21B. In the fourth screen 1903, an output button 1915, a recovery button 1916, a standard button 1917, and a finish button 1918 are arranged.

Case 4: flag A: OFF, flag B: ON, flag C: OFF

The fact that the flag B alone is ON means that the authenticated user has no document that waits for output but has a document that has not recovered. In this case, the document output device 301 displays a fifth screen 1904 shown in FIG. 21C. In the fifth screen 1904, a recovery button 1920, a standard button 1921, and a finish button 1922 are arranged.

Case 5: flag A: ON, flag B: ON, flag C: ON or
flag A: OFF, flag B: ON, flag C: ON When the flag C is ON, that is, when the user is restricted to output, the authenticated user has a document that has not recovered and a normal recovery is not performed. In this case, the document output device 301 displays a sixth screen 1905 shown in FIG. 21D. In the sixth screen 1905, a recovery button 1923, a standard button 1924, a message of "Output is restricted. Please recover document.", and a finish button 1925 are arranged. Thus, when the user concerned is restricted to output, the output button is not displayed.

Next, a document output process executed by the document output device 301 when receiving various operations from the user on the third through sixth screens mentioned above will be described.

Figure 9:
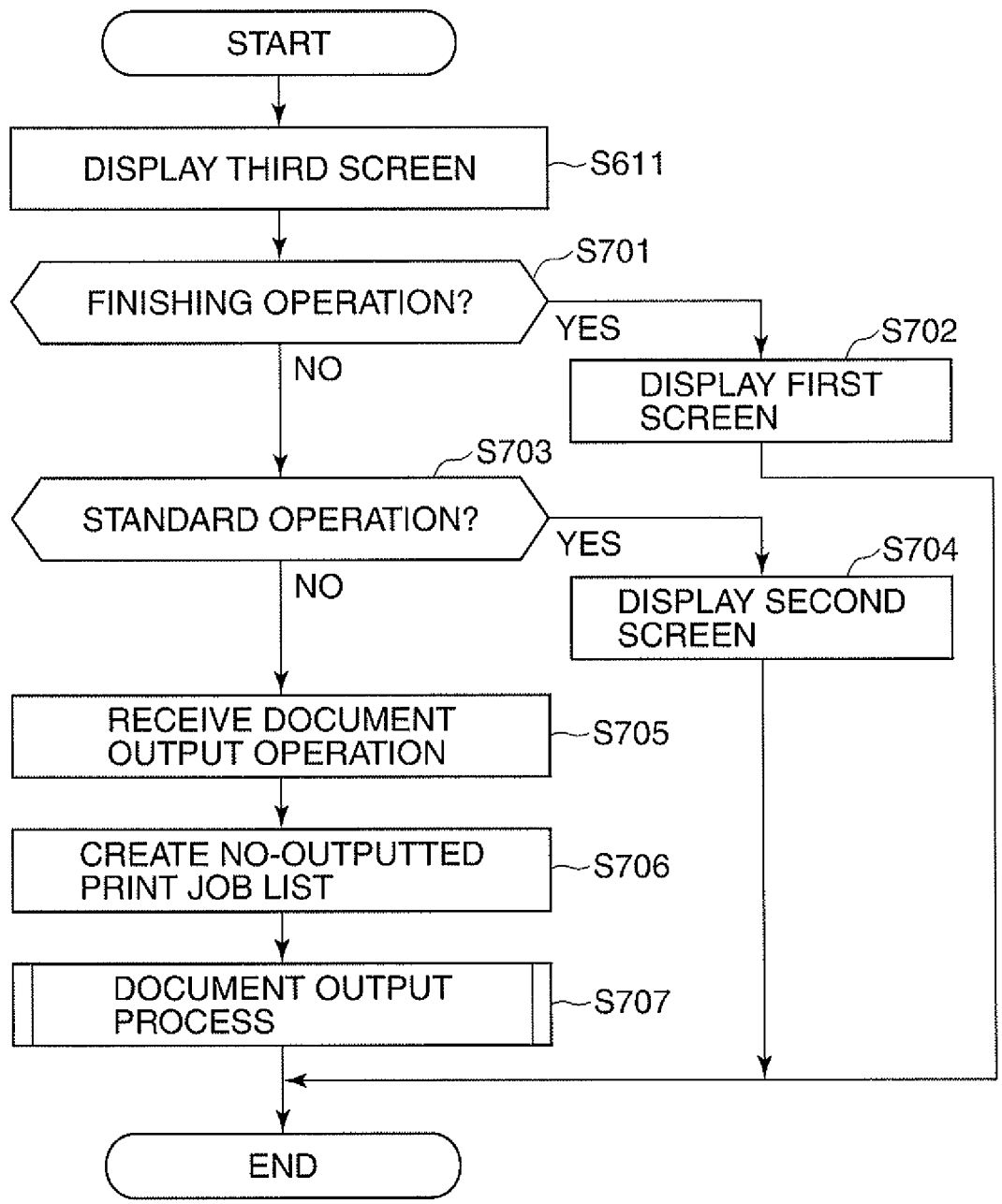
FIG. 9 is a flowchart showing an example of an operation process of the document output device when receiving a user operation via a third screen.
Figure 10:
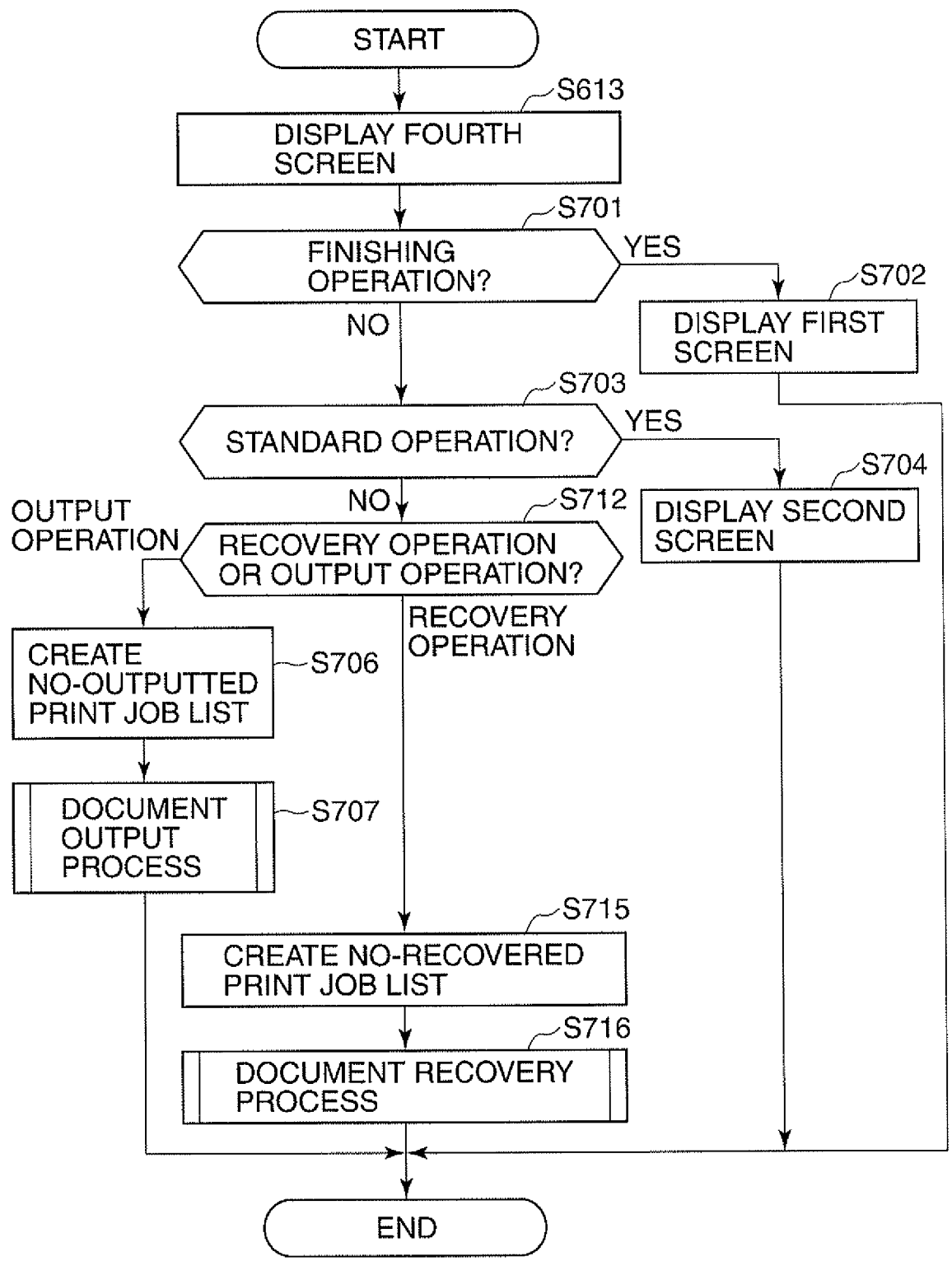
FIG. 10 is a flowchart showing an example of an operation process of the document output device when receiving a user operation via a fourth screen.
Figure 11:
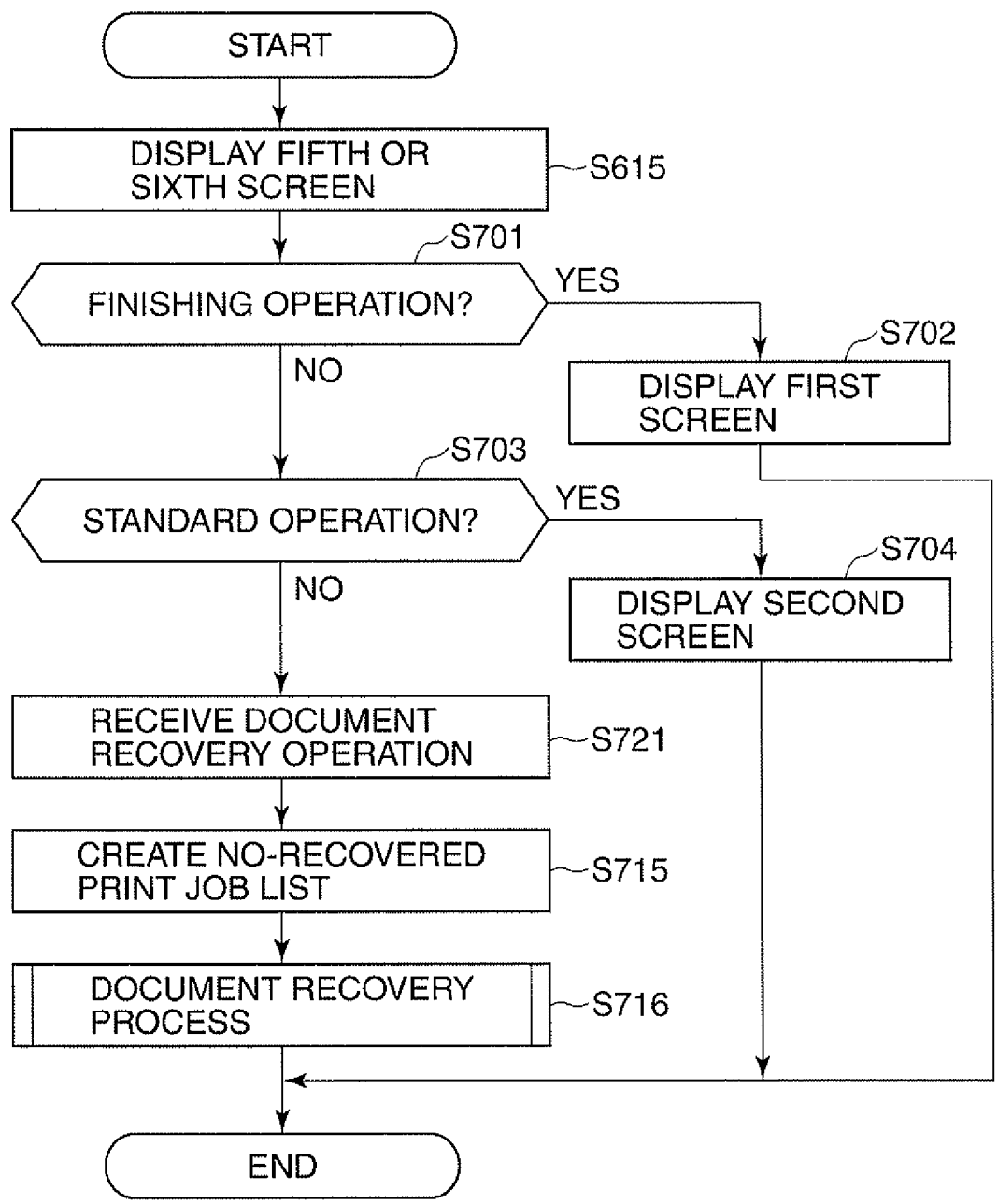
FIG. 11 is a flowchart showing an example of an operation process of the document output device when receiving a user operation via a fifth screen or a sixth screen.

FIG. 9 through FIG. 11 are flowcharts showing the document output process executed by the document output device 301. It should be noted that steps in which a common process is executed are represented by the same step number and their descriptions are partially omitted.

In FIG. 9 through FIG. 11, when the document output device 301 receives a finishing operation via the liquid crystal panel with I/F 35 (YES in step S701) while one of the third, fourth, fifth, and sixth screens is displayed (step S611, S613, or S615), the first screen page 1900 is displayed (step S702), and the process is finished. The finishing operation means a depression of one of the finish buttons 1914, 1918, 1922, and 1925. On the other hand, when a standard operation is received via the liquid crystal panel with I/F 35 (YES in step S703), the second screen 1901 is displayed (step S704), and the process is finished. The standard operation means a depression of one of the standard buttons 1913, 1917, 1921, and 1924.

In FIG. 9, when an output operation (a depression of the output button 1912) is received (step S705) while the third screen 1902 is displayed (step S611), the document output device 301 searches the document management server 201 for the print job that is designated by the authenticated user (the print job of the output document ID corresponding to the user ID of the authenticated user), acquires the print job information (the output document ID and the file name) whose output flag is "no-outputted", and creates a no-outputted document list (a no-outputted print job list) (step S706). Then, the document output device 301 executes the document output process (step S707), and finishes the process. Details of the document output process will be described below. The no-outputted document list is a list of the print job information about the print job whose output flag is "no-outputted" among the print jobs designated by the user.

In FIG. 10, when the output operation (a depression of the output button 1915) is received (the output operation in step S712) while the fourth screen 1903 is displayed (step S613), the document output device 301 executes the above described steps S706 and S707, and finishes the process. On the other hand, when a recovery operation (a depression of the recovery key 1916) is received (the recovery operation in step S712), the document output device 301 searches the document management server 201 for the print job that is designated by the authenticated user, acquires the print job information (the output document ID, the file name, and the date and time of output) whose recovery flag is "no-recovered", and creates a no-recovered document list (a no-recovered print job list) (step S715). Then, the document output device 301 executes the document recovery process (step S716), and finishes the process. According to the above-mentioned process, even when there is a no-recovered document, the user can easily recover the document by searching a no-recovered print job. Details of the document recovery process will be described below. The no-recovered document list is a list of the print job information of the print jobs designated by the user and includes the output document ID, the file name, and the date and time of output of the print job whose recovery flag is "no-recovered".

In FIG. 11, when the recovery operation (a depression of the recovery key 1920 or 1923) is received (step S721) while the fifth or sixth screen is displayed (step S615), the document output device 301 executes the above described steps S715 and S716, and finishes the process.

According to the above described processes, a recovery failure of confidential documents can be prevented and only confidential documents that are necessary to be recovered can be recovered.

Next, the document output process in step S707 in FIG. 9 and FIG. 10 will be described in detail.

Figure 12:
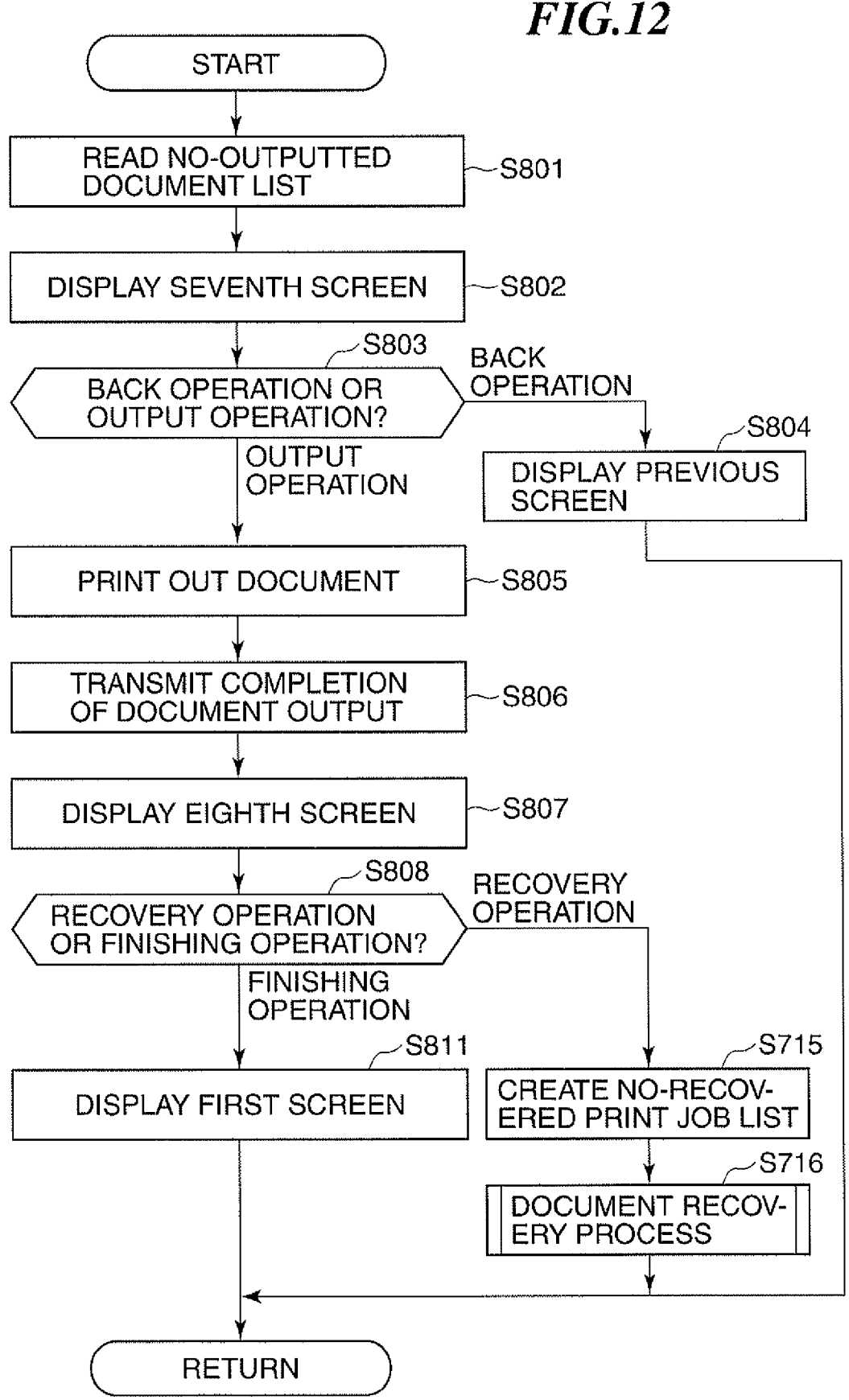
FIG. 12 is a flowchart showing details of the document output process in step S707 in FIG. 9 and FIG. 10.

FIG. 12 is a flowchart showing details of the document output process in step S707 in FIG. 9 and FIG. 10.

Figure 22A:
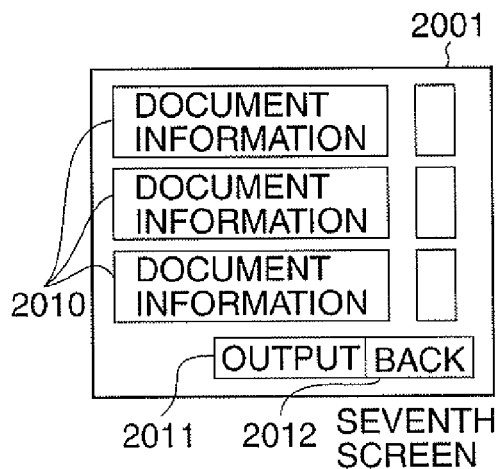
FIG. 22A is a view showing an example of a screen displayed by the document output device during the process of FIG. 12.

In FIG. 12, the document output device 301 reads the no-outputted document list created in step S706 (step S801), and displays a seventh screen 2001 shown in FIG. 22A (step S802). In the seventh screen 2001, the document information 2010 of the no-outputted document (the no-outputted print job) is displayed. The document information 2010 is the print job information (the output document ID and the file name of the no-outputted print job) whose output flag is "no-outputted". In the seventh screen 2001, an output button 2011 and a back button 2012 are displayed.

When a back operation (a depression of the back button 2012) is received (the back operation in step S803), the document output device 301 displays the screen before displaying the seventh screen (step S804), and returns the process to FIG. 9 or FIG. 10. On the other hand, when a selection of the output document and a document output operation (a depression of the output button 2011) are received from the user (the output operation in step S803), the document output device 301 outputs the selected document (step S805). When outputting the document, the document output device 301 transmits the output document ID to the document management server 201. Then, receiving the output document ID, the document management server 201 transmits the print job corresponding to the output documents ID received to the document output device 301. When receiving the transmitted print job, the document output device 301 performs a document outputting (printing) via the print engine 40.

In step S806, the document output device 301 transmits the output document ID of the print job that is completed to be outputted to the document management server 201 (transmit the completion to output the document). Receiving the output document ID from the document output device 301, the document management server 201 executes a document information update process shown in FIG. 15.

Figure 15:
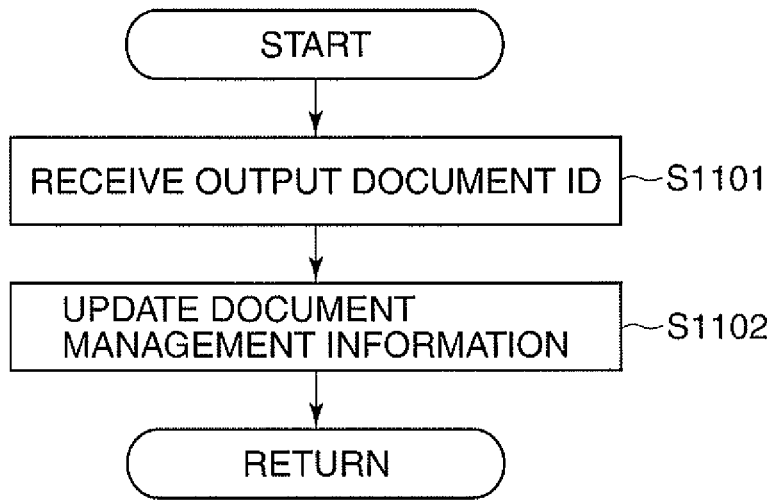
FIG. 15 is a flowchart showing a document management information update process executed by the document management server.

In FIG. 15, when receiving the output document ID (step S1101), the document management server 201 updates the document management information shown in FIG. 17A through FIG. 17C (step S1102). Specifically, the document management server 201 sets "outputted" to the output flag corresponding to the output document ID of the print job that is completed to output, updates the date and time of output, sets "no-recovered" to the recovery flag, and increases the number of the output documents (the number of the outputted print jobs).

Figure 22B:
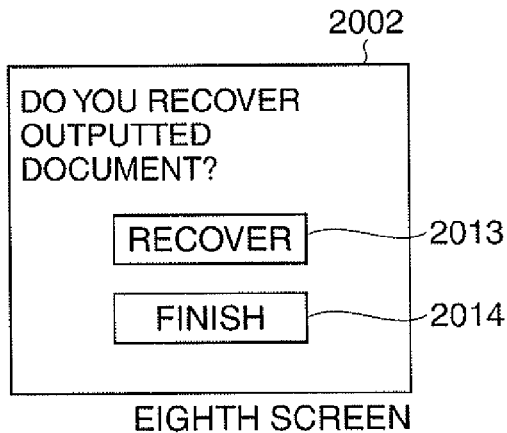
FIG. 22B is a view showing an example of a screen displayed by the document output device during the process of FIG. 12.

Returning to FIG. 12, the document output device 301 displays an eighth screen 2002 shown in FIG. 22B in step S807 after the completion to output the document (after the completion to update the document information). In the eighth screen 2002, a message of "Do you recover outputted document?" is displayed with a recovery button 2013 and a finish button 2014.

Next, when receiving the finishing operation (a depression of the finish button 2014) on the eighth screen 2002 from the user (the finishing operation in step S808), the document output device 301 displays the first screen 1900 (step S811), and returns the process to FIG. 9 or FIG. 10. On the other hand, when the recovery operation (a depression of the recovery key 2013) is received (the recovery operation in step S808), the document output device 301 executes the above described steps S715 and S716, and returns the process to FIG. 9 or 10.

Next, the document recovery process in step S716 in FIG. 10 through FIG. 12 will be described in detail.

Figure 13A:
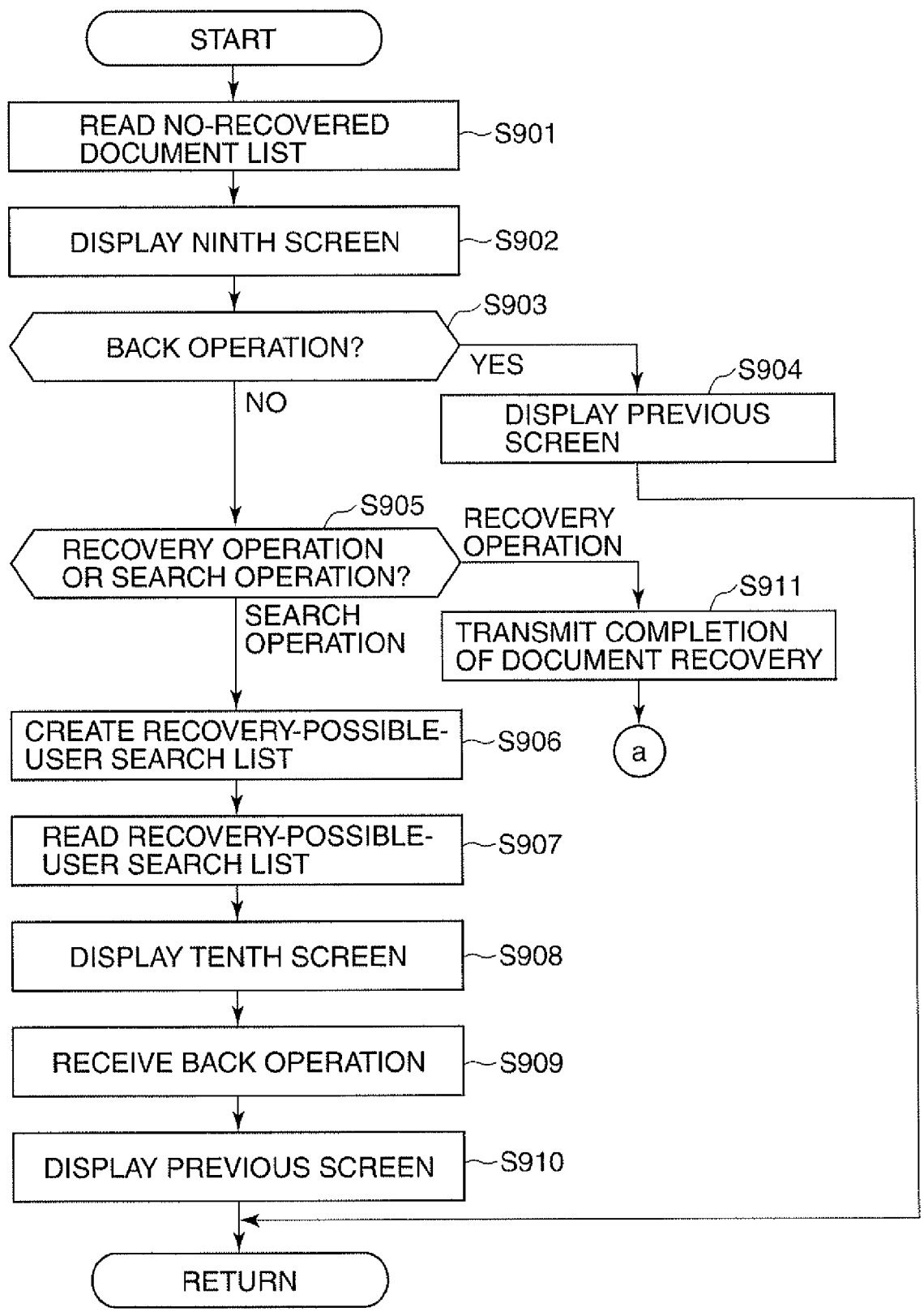
FIG. 13A is a flowchart showing details of a document recovery process in step S716 in FIG. 10 through FIG. 12.
Figure 13B:
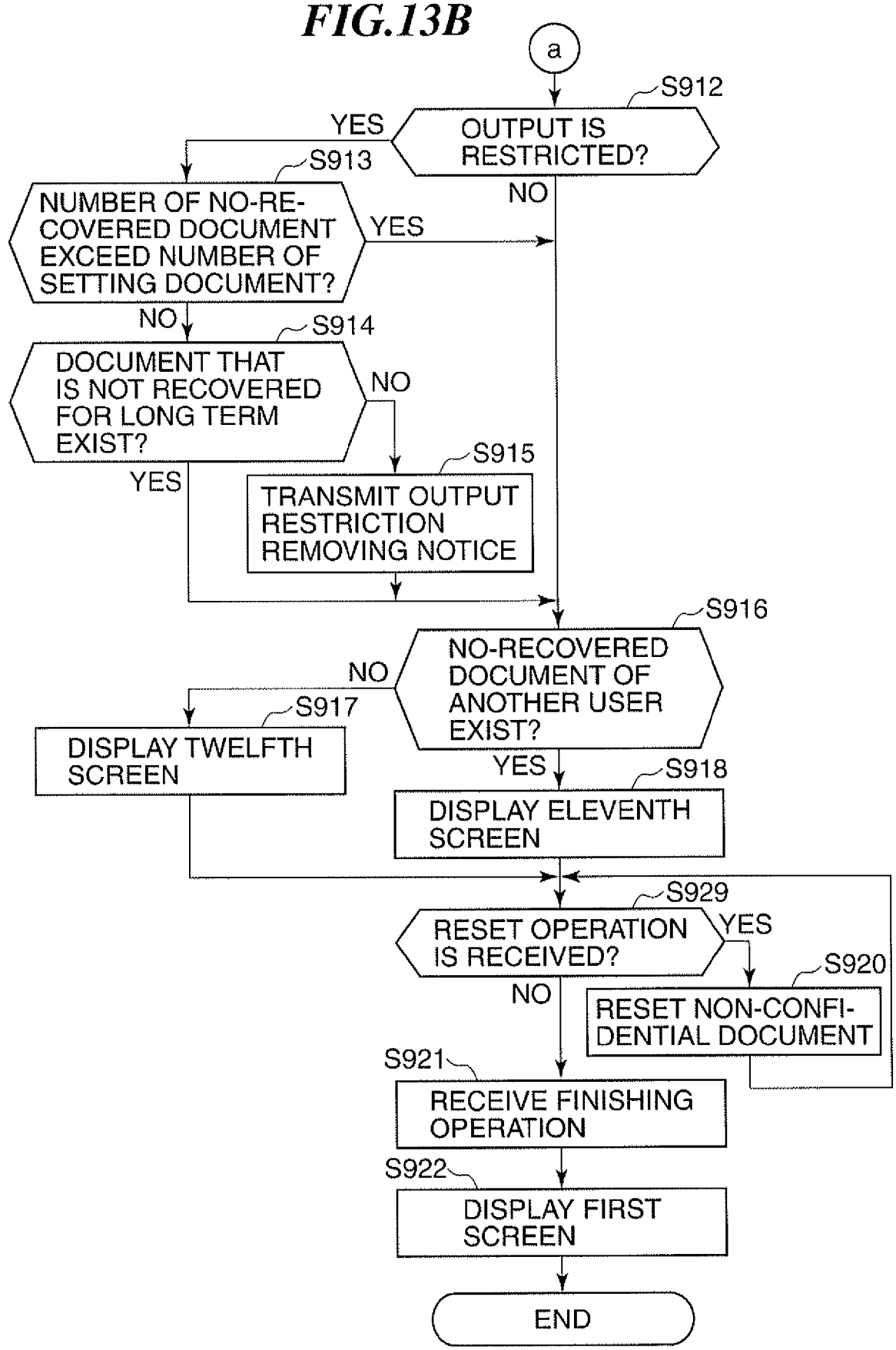
FIG. 13B is a flowchart showing details of the document recovery process in step S716 in FIG. 10 through FIG. 12.

FIG. 13A and FIG. 13B are flowcharts showing details of the document recovery process in step S716 in FIG. 10 through FIG. 12.

Figure 22C:
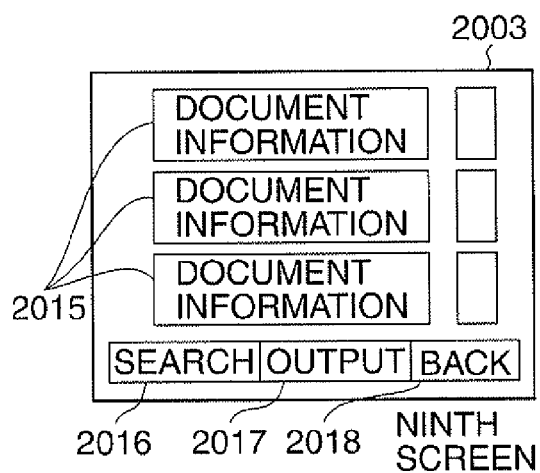
FIG. 22C is a view showing an example of a screen displayed by the document output device during the process of FIG. 13A.

In FIG. 13A, the document output device 301 reads the no-recovered document list created (step S901), and displays a ninth screen 2003 shown in FIG. 22C (step S902). In the ninth screen 2003, document information 2015 of the no-recovered documents is displayed as a list. The document information 2015 is the print job information including the output document ID, the file name, and the date and time of output of the print job whose recovery flag is "no-recovered" in the no-recovered document list. In the ninth screen 2003, a search button 2016, a recovery button 2017, and a back button 2018 are displayed.

When a back operation (a depression of the back button 2018) by the user is received (YES in step S903), the document output device 301 displays the screen before displaying the ninth screen (step S904), and returns the process to FIG. 10, 11, or 12. On the other hand, when a selection of the recovery document and a search operation (a depression of the search button 2016) are received from the user (the search operation in step S905), the document output device 301 acquires the date and time of output of the selected recovery document and the date and time of execution of the search operation (the present date and time) from the document management server 201. Then, the document output device 301 acquires the user information (the user ID, the user name, and the date and time of the document recovery) of the users who outputted the normal documents (the documents outputted in step S509) and the users who recovered the instant-output possible print job and the authenticated output print job (the documents outputted in step S509 or S805) during the interval between the date and time of output of the selected recovery document and the present date and time, and creates a user list (a recovery-possible-user search list) (step S906) based on those information. The user list is a list of the user information including the user ID and the user name of the user who has possibility to recover the selected document shown in FIG. 17A, and the date and time of the document recovery.

Here, a concrete example of step S906 will be described below.

In the following case, when the search operation is received from a user A at 15:00 (the search operation in step S905), the document output device 301 searches for the user who outputted the normal print job or recovered the instant-output possible print job or the authenticated output print job between 13:00 and 15:00. Specifically, the document output device 301 creates a list of the users who output documents whose recovery times are included between 13:00 and 15:00 with reference to the document information. As a result, since users B and F are included in the list, the documents that were improperly recovered by the other users B and F can be searched easily, which can realize a reliable documentation management.

Present time 15:00
User A: Outputted an instant-output possible print job at 13:00 (no-recovered).
User B: Outputted a normal print job at 14:00.
User C: Outputted a normal print job at 12:00.
User D: Transmitted an authenticated output print job at 13:30 (no-outputted).
User E: Outputted an instant-output possible print job at 14:15 (no-recovered).
User F: Outputted an instant-output possible print job at 11:00, and recovered the instant-output possible print job at 14:40.

Figure 22D:
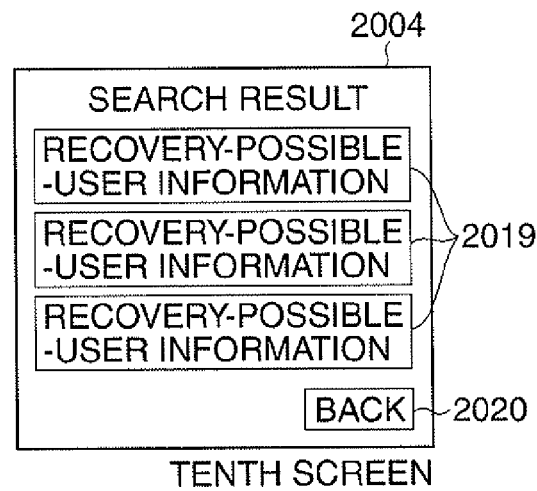
FIG. 22D is a view showing an example of a screen displayed by the document output device during the process of FIG. 13A.

Returning to FIG. 13A, the document output device 301 reads the created recovery-possible-user search list in step S907, and displays a tenth screen 2004 shown in FIG. 22D (step S908). In the tenth screen 2004, the recovery-possible-user search list 2019 including the user ID, the user name and the date and time of the document recovery, and a back button 2020 are displayed. Next, when a back operation (a depression of the back button 2020) is received (step S909), the document output device 301 displays the screen before displaying the tenth screen (step S910), and returns the process to FIG. 10, 11, or 12.

On the other hand, in step S905, when the document output device 301 receives the recovery operation (a depression of the recovery button 2017) for the recovery target document from the user and determines that the document recovery is completed (the recovery operation in step S905), proceeds with the process to step S911. In step S911, the document output device 301 transmits the output document ID of the print job that is completed to be recovered to the document management server 201 (transmits the completion to recover the document), and proceeds with the process to step S912 in FIG. 13A. Receiving the output document ID from the document output device 301, the document management server 201 executes the document information update process shown in FIG. 15.

In FIG. 15, when receiving the output document ID (step S1101), the document management server 201 updates the document management information shown in FIG. 17A through FIG. 17C (step S1102). Specifically, the document management server 201 sets "recovered" to the recovery flag corresponding to the output document ID of the print job that is completed to recover the document, updates the date and time of recovery, and decreases the number of the output documents (the number of the outputted print jobs).

In FIG. 13B, in step S912, the document output device 301 queries the document management server 201 to check whether the user is restricted to output. When the user is restricted to output (YES in step S912), the document output device 301 executes an output restriction removing process in steps S913 through S915. Details of the output restriction removing process will be described below.

Figure 23A:
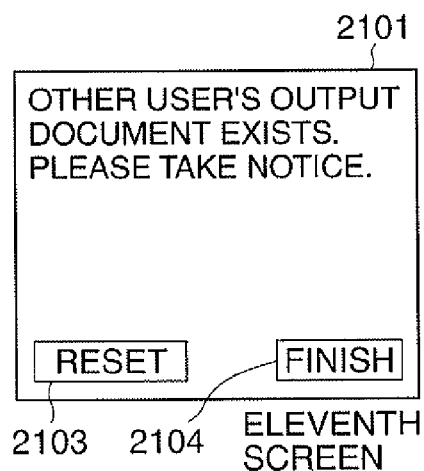
FIG. 23A is a view showing an example of a screen displayed by the document output device during the process of FIG. 13B.

On the other hand, in step S912, when the user is not restricted to output (the output restriction flag is OFF, and NO in step S912), the document output device 301 queries the document management server 201 to check whether there is another user's document (a print job) whose recovery flag is "no-recovered" at present among all the documents registered in the document management server 201 (step S916) (a second recovery job determination). As a result of the query, when there is another user's no-recovered document exists (YES in step S916), an eleventh screen 2101 shown in FIG. 23A is displayed (step S918). In the eleventh screen 2101, the message of "Other user's output document exists. Please take notice." is displayed in addition to a reset button 2103 and a finish button 2104.

Figure 23B:
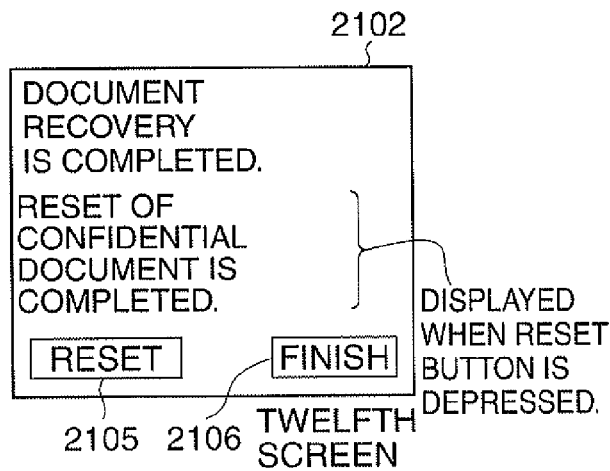
FIG. 23B is a view showing an example of a screen displayed by the document output device during the process of FIG. 13B.

On the other hand, in step S916, when another user's no-recovered document does not exist (NO in step S916), a twelfth screen 2102 shown in FIG. 23B is displayed (step S917). In the twelfth screen 2102, the message of "Document recovery is completed." is displayed in addition to a reset button 2105 and a finish button 2106.

When a reset operation (a depression of the reset button) is received on the eleventh screen 2101 or the twelfth screen 2102 (YES in step S929), the document output device 301 deletes the information about the non-confidential document (a reset of non-confidential document) from the document management server 201 and the document output device 301 (step S920). The target of the deletion is the information about the confidential document that is completed to be recovered before the oldest output date and time of the document whose recovery flag is "no-recovered" in all the users' document management information (FIG. 17A through FIG. 17C) that is saved in the document management server 201 and the normal documents that have been outputted by the user until then. It should be noted that the message of "Reset of no-confidential document job is completed." is displayed when the reset button 2105 is depressed on the twelfth screen 2102.

On the other hand, when a finish operation (a depression of the finish button) is received on the eleventh screen 2101 or the twelfth screen 2102 (NO in step S921), the document output device 301 displays the first screen 1900 (step S922).

Next, the output restriction process will be described. The output restriction is a document management function that is executed by the system based on the property of the confidential document. This function prohibits the user from further outputting of the confidential documents when the user leaves the confidential documents for a long term or leaves the large number of the confidential documents.

Figure 14:
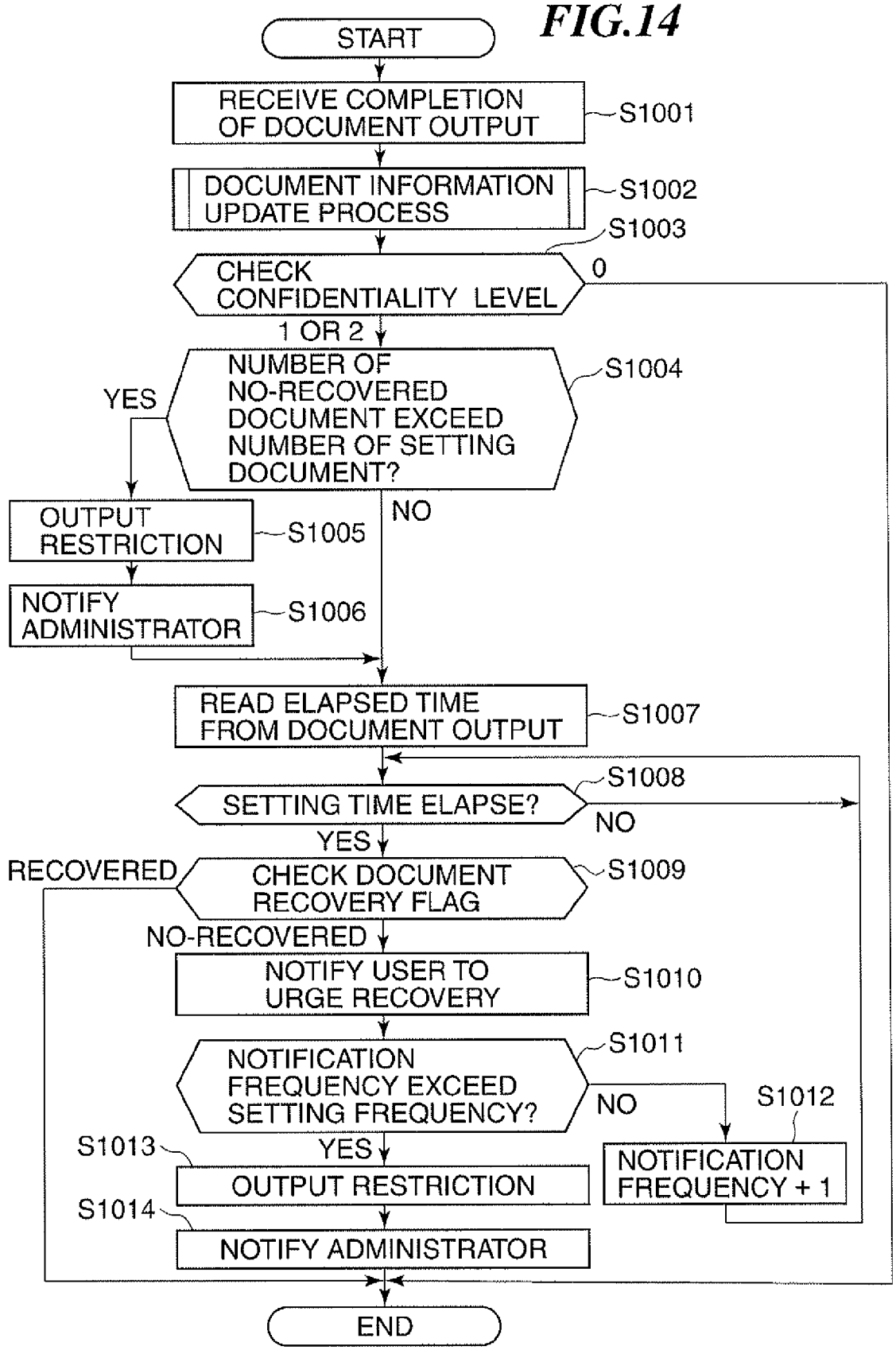
FIG. 14 is a flowchart showing an output restriction process executed by the document management server.

FIG. 14 is a flowchart showing the output restriction process executed by the document management server 201.

In FIG. 14, the document management server 201 receives the output document ID of the print job that is completed to output from the document output device 301 (step S1001), and then, executes the document information update process shown in FIG. 15 (step S1002). Next, the document management server 201 checks the confidentiality level (the confidentiality level in the document information 1602 in FIG. 17B) of the print job that is completed to be outputted (step S1003), and determines whether the print job is a confidential print job or a normal print job. When the print job is a normal print job (the confidentiality level is "0"), this process is finished because it is not a target of the output restriction. On the other hand, when the print job is determined as a confidential print job (the confidentiality level is "1" or "2"), the process proceeds to step S1004.

In step S1004, the document management server 201 compares the number of the no-recovered documents (the number of the documents whose recovery flags are "no-recovered") with the number of the setting document with reference to the document management information shown in FIG. 17A through FIG. 17C, and determines whether the number of the no-recovered documents exceeds the number of the setting document. When the number of the no-recovered document exceeds the number of the setting document (YES in step S1004), the document management server 201 sets "ON" to the output restriction flag of the user information 1601 (step S1005). And the document management server 201 sets the output restriction for the user concerned, and notifies the administrator-oriented PC 401 (step S1006).

In step S1004, when the number of the no-recovered document does not exceed the number of the setting document (NO in step S1004), the document management server 201 checks the recovery flag of the document information 1602 (steps S1007 through S1009) every time a setting time of the setting information 1603 elapses. When the document is not recovered ("no-recovered" in step S1009), the document management server 201 notifies the user-oriented PC 101 to urge to recover the document, and increases the value of the notification frequency of the document information 1602 (steps S1010 and S1012). When the notification frequency exceeds the setting frequency (YES in step S1011), the output restriction flag of the user information 1601 is set to "ON" (step S1013). And the document management server 201 sets the output restriction on the user concerned, and notifies the user-oriented PC 401 (step S1014).

According to the above-mentioned process, each user is made sure so as to manage confidential documents properly, which enables a smooth management of the security system.

Figure 16:
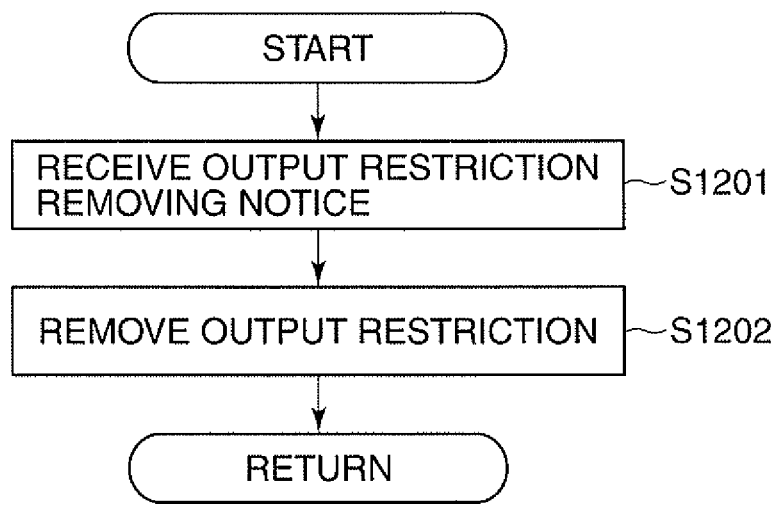
FIG. 16 is a flowchart showing an output restriction removing process executed by the document management server.

Next, the output restriction removing process will be described with reference to FIG. 13B and FIG. 16. The output restriction is removed when a confidential document is recovered and a predetermined condition is satisfied.

In FIG. 13B, the document output device 301 determines whether the output restriction removing condition is satisfied, when the user is under the output restriction (the output restriction flag is "ON", YES in step S912). One of the output restriction removing conditions is that the number of the no-recovered document of the print job that is designated by the user concerned does not exceed the number of the setting document. In order to check whether the number of the no-recovered document exceeds the number of the setting document, the document output device 301 queries the document management server 201 about the recovery flag of the document that is designated by the user concerned. When the number of the no-recovered document exceeds the number of the setting document (YES in step S913), the document output device 301 finishes the output restriction removing process, and joins the document recovery process (step S916).

On the other hand, when the number of the no-recovered document does not exceed the number of the setting document (NO in step S913), the document output device 301 determines whether the notification frequency of the no-recovered document that is designated by the user is less than the setting frequency. That is, the document output device 301 determines by querying the document management server 201 about whether there is a document that is not recovered for a long term (step S914).

When there is a document that is not recovered for a long term (YES in step S914), the document output device 301 finishes the output restriction removing process, and joins the document recovery process (step S916). On the other hand, when there is no document that is not recovered for a long term (NO in step S914), the document output device 301 determines that the output restriction removing condition is satisfied, and transmits an output restriction removing notice (an instruction to change the output restriction flag of the user information 1601 in FIG. 17A from "ON" to "OFF") to the document management server 201 (step S915). Receiving the output restriction removing notice from the document output device 301 (step S1201), the document management server 201 changes the output restriction flag from "ON" to "OFF" (removes the output restriction, step S1202).

The above-mentioned process lightens burden of the operation performed by the system administrator, and enables a smooth management of the system.

According to the above-mentioned embodiment, documents of a recovery target print job (for example, confidential documents) can be easily recovered without forcing the user to do complicated operations. Further, since a recovery failure of confidential documents can be prevented and the documents are not determined to be recovered even if the user re-authenticates, the printed confidential documents can be recovered properly.

Other Embodiments

Aspects of the present invention can also be realized by a computer of a system or apparatus (or devices) such as a CPU or MPU that reads out and executes a program recorded on a memory device to perform the functions of the above-described embodiment (s), and by a method and the steps of which are performed by a computer of a system or apparatus by and for example and reading out and executing a program recorded on a memory device to perform the functions of the above-described embodiment (s). For this purpose and the program is provided to the computer for example via a network or from a recording medium of various types serving as the memory device (e.g., computer-readable medium).

While the present invention has been described with reference to exemplary embodiments and it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-267253, filed Oct. 16, 2008, which is hereby incorporated by reference herein in its entirety.

What is claimed is:

1. A printing system comprising:
an information processing apparatus adapted to transmit a print job, comprising:
a management information storage unit that stores management information including no-output information and recovery information of a print job that becomes a target to be recovered; and
a management information transmission unit that transmits the management information including the no-output information and the recovery information of the print job corresponding to user information, and
an image forming apparatus adapted to print out the print job received from said information processing apparatus, comprising:
an identifying information input unit that receives an input of identifying information for identifying a user;
a user information transmission unit that transmits the user information determined by authenticating the received identifying information to said information processing apparatus;
a management information receiving unit that receives the management information of the print job corresponding to the transmitted user information from said information processing apparatus;
a display unit that displays a screen corresponding to the management information; and
a display control unit that controls the display unit so as to display a no-outputted print job according to the no-output information included in the management information when an output operation for the print job is received on the displayed screen, and to display a no-recovered print job according to the recovery information included in the management information when a recovery operation for the print job is received;
wherein said image forming apparatus receives a recovery operation for the no-recovered print job displayed on the display unit, and transmits a completion of recovery to said information processing apparatus to treat the print job to which the recovery operation is received as "recovered", and
wherein the display control unit controls the display unit to display a screen on which a search button for receiving a search operation of the no-recovered print job is arranged, and wherein the display control unit acquires, when the search operation for the no-recovered print job is received by the search button, date and time of output of the no-recovered print job and date and time of receiving the search operation, acquires the user information about the user who outputs and recovers the print job between the date and time of the output and the date and time of the search operation, and controls the display unit to display the acquired user information.

2. The printing system according to claim 1, wherein the display control unit controls the display unit to display a screen on which an output button for receiving the output operation of the print job is arranged when the print job is determined as no-outputted according to the no-output information included in the received management information, and wherein the display control unit controls the display unit to display a screen on which a recovery button for receiving the recovery operation of the print job is arranged when the print job is determined as no-recovered according to the recovery information included in the received management information.

3. The printing system according to claim 2, wherein said information processing apparatus further comprises:
a recovery notification unit that notifies a user to urge recovery at predetermined intervals;
a notification frequency determination unit that determines whether the notification frequency exceeds a setting frequency; and
an output restriction notification unit that sets information showing that the output of the print job designated by the user concerned is restricted to the management information, and notifies said image forming apparatus when the notification frequency exceeds the setting frequency,
wherein the display control unit controls the display unit to display a screen on which the output button is not arranged when receiving the notice from the output restriction notification unit.

4. The printing system according to claim 3, wherein the recovery notification unit checks the management information to determine whether no-recovered print job exists every time the predetermined setting time elapses, and then, notifies the user to urge recovery when no-recovered print job exists.

5. The printing system according to claim 1, wherein said information processing apparatus further comprises a first recovery job determination unit that determines whether a print job becomes a target to be recovered, and
wherein the management information storage unit registers "no-recovered" as the management information of the print job that is determined to need recovery by the first recovery job determination unit, and updates the management information from "no-recovered" to "recovered" when the identifying information of the print job that has recovered is received from said image forming apparatus.

6. The printing system according to claim 5, wherein the first recovery job determination unit determines whether the print job is a target of recovery based on confidentiality level designated by a printer driver of an external device.

7. The printing system according to claim 1, wherein said image forming apparatus further comprises:
a second recovery job determination unit that determines whether a no-recovered print job of another user exists when receiving the recovery operation; and
a notification unit that notifies a user that a no-recovered print job of another user exists when a no-recovered print job of another user exists.

8. The printing system according to claim 1, wherein said information processing apparatus further comprises:

an authentication printing determination unit that determines whether a print job becomes possible to print as a result of an authentication, wherein the display control unit controls the display unit to display the print job that is determined to become possible to print as a result of the authentication by the authentication printing determination unit as a no-outputted print job.

9. A control method for a printing system that is provided with an information processing apparatus for transmitting a print job and an image forming apparatus for printing out the print job received from the information processing apparatus, the method comprising:

a management information storage step of storing management information including no-output information and recovery information of a print job that becomes a target to be recovered;

a management information transmission step of transmitting the management information including the no-output information and the recovery information of the print job corresponding to user information;

a management information replying step of sending the management information, which includes the no-output information and the recovery information of the print job corresponding to the user information received from the image forming apparatus, to the image forming apparatus concerned;

a display step of displaying a screen corresponding to the management information received by the image forming device;

wherein a no-outputted print job is displayed according to the no-output information included in the management information when an output operation for the print job is received on the displayed screen, and a no-recovered print job is displayed according to the recovery information included in the management information when a recovery operation for the print job is received, in said display step;

wherein said image forming apparatus receives a recovery operation for the no-recovered print job displayed on the screen, and transmits a completion of recovery to said information processing apparatus to treat the print job to which the recovery operation is received as "recovered", and wherein a screen is displayed on which a search button for receiving a search operation of the no-recovered print job is arranged, and wherein, when the search operation for the no-recovered print job is received by the search button, date and time of output of the no-recovered print job and date and time of receiving the search operation are acquired, the user information about the user who outputs and recovers the print job between the date and time of the output and the date and time of the search operation is acquired, and the acquired user information is displayed.

10. A non-transitory computer-readable storage medium storing code of a control program for causing a computer to execute the control method according to claim 9.

11. An image forming apparatus that prints out a print job received from an information processing apparatus, comprising:

a management information storage unit adapted to store management information including no-output information and recovery information of a print job that becomes a target to be recovered;

an identifying information input unit adapted to receive an input of identifying information for identifying a user;

a management information acquisition unit adapted to acquire the management information of the print job corresponding to the user information determined by authenticating the input identifying information;

a display unit adapted to display a screen corresponding to the acquired management information; and a display control unit adapted to control the display unit so as to display a no-outputted print job according to the no-output information included in the management information when an output operation for the print job is received on the displayed screen, and to display a no-recovered print job according to the recovery information included in the management information when a recovery operation for the print job is received, wherein said image forming apparatus receives a recovery operation for the no-recovered print job displayed on the display unit, and transmits a completion of recovery to said information processing apparatus to treat the print job to which the recovery operation is received as "recovered", and wherein the display control unit controls the display unit to display a screen on which a search button for receiving a search operation of the no-recovered print job is arranged, and wherein the display control unit acquires, when the search operation for the no-recovered print job is received by the search button, date and time of output of the no-recovered print job and date and time of receiving the search operation, acquires the user information about the user who outputs and recovers the print job between the date and time of the output and the date and time of the search operation, and controls the display unit to display the acquired user information.

12. A printing system comprising:

an information processing apparatus adapted to transmit a print job, comprising:

a management information storage unit that stores management information including no-output information and recovery information of a print job that becomes a target to be recovered; and a management information transmission unit that transmits the management information including the no-output information and the recovery information of the print job corresponding to user information, and an image forming apparatus adapted to print out the print job received from said information processing apparatus, comprising:

an identifying information input unit that receives an input of identifying information for identifying a user;

a user information transmission unit that transmits the user information determined by authenticating the received identifying information to said information processing apparatus;

a management information receiving unit that receives the management information of the print job corresponding to the transmitted user information from said information processing apparatus;

a display unit that displays a screen corresponding to the management information; and a display control unit that controls the display unit so as to display a no-outputted print job according to the no-output information included in the management information when an output operation for the print job is received on the displayed screen, and to display a no-recovered print job according to the recovery information included in the management information when a recovery operation for the print job is received, wherein the display control unit controls the display unit to display a screen on which an output button for receiving the output operation of the print job is arranged when the print job is determined as no-outputted according to the no-output information included in the received management information, and wherein the display control unit controls the display unit to display a screen on which a recovery button for receiving the recovery operation of the print job is arranged when the print job is determined as no-recovered according to the recovery information included in the received management information, and wherein said information processing apparatus further comprises:

a recovery notification unit that notifies a user to urge recovery at predetermined intervals;

a notification frequency determination unit that determines whether the notification frequency exceeds a setting frequency; and an output restriction notification unit that sets information showing that the output of the print job designated by the user concerned is restricted to the management information, and notifies said image forming apparatus when the notification frequency exceeds the setting frequency, wherein the display control unit controls the display unit to display a screen on which the output button is not arranged when receiving the notice from the output restriction notification unit.

13. The printing system according to claim 12, wherein the recovery notification unit checks the management information to determine whether no-recovered print job exists every time the predetermined setting time elapses, and then, notifies the user to urge recovery when no-recovered print job exists.

14. A control method for a printing system that is provided with an information processing apparatus for transmitting a print job and an image forming apparatus for printing out the print job received from the information processing apparatus, the method comprising:

a management information storage step of storing management information including no-output information and recovery information of a print job that becomes a target to be recovered;

a management information transmission step of transmitting the management information including the no-output information and the recovery information of the print job corresponding to user information;

a management information replying step of sending the management information, which includes the no-output information and the recovery information of the print job corresponding to the user information received from the image forming apparatus, to the image forming apparatus concerned;

a display step of displaying a screen corresponding to the management information received by the image forming device;

wherein a no-outputted print job is displayed according to the no-output information included in the management information when an output operation for the print job is received on the displayed screen, and a no-recovered print job is displayed according to the recovery information included in the management information when a recovery operation for the print job is received, in said display step, wherein a screen is displayed on which an output button for receiving the output operation of the print job is arranged when the print job is determined as no-outputted according to the no-output information included in the received management information, and wherein a screen is displayed on which a recovery button for receiving the recovery operation of the print job is arranged when the print job is determined as no-recovered according to the recovery information included in the received management information, and wherein said information processing apparatus further comprises:

notifies a user to urge recovery at predetermined intervals;

determines whether the notification frequency exceeds a setting frequency; and sets information showing that the output of the print job designated by the user concerned is restricted to the management information, and notifies said image forming apparatus when the notification frequency exceeds the setting frequency, wherein the a screen is displayed on which the output button is not arranged when receiving the notice.

15. A non-transitory computer-readable storage medium storing code of a control program for causing a computer to execute the control method according to claim 14.

16. An image forming apparatus that prints out a print job received from an information processing apparatus, comprising:

a management information storage unit adapted to store management information including no-output information and recovery information of a print job that becomes a target to be recovered;

an identifying information input unit adapted to receive an input of identifying information for identifying a user;

a management information acquisition unit adapted to acquire the management information of the print job corresponding to the user information determined by authenticating the input identifying information;

a display unit adapted to display a screen corresponding to the acquired management information; and a display control unit adapted to control the display unit so as to display a no-outputted print job according to the no-output information included in the management information when an output operation for the print job is received on the displayed screen, and to display a no-recovered print job according to the recovery information included in the management information when a recovery operation for the print job is received, wherein the display control unit controls the display unit to display a screen on which an output button for receiving the output operation of the print job is arranged when the print job is determined as no-outputted according to the no-output information included in the received management information, and wherein the display control unit controls the display unit to display a screen on which a recovery button for receiving the recovery operation of the print job is arranged when the print job is determined as no-recovered according to the recovery information included in the received management information, and wherein said information processing apparatus further comprises:

a recovery notification unit that notifies a user to urge recovery at predetermined intervals;

a notification frequency determination unit that determines whether the notification frequency exceeds a setting frequency; and an output restriction notification unit that sets information showing that the output of the print job designated by the user concerned is restricted to the management information, and notifies said image forming apparatus when the notification frequency exceeds the setting frequency, wherein the display control unit controls the display unit to display a screen on which the output button is not arranged when receiving the notice from the output restriction notification unit.

* * * * *